United States Patent [19]
Doty

[11] 4,229,876
[45] Oct. 28, 1980

[54] OPTICAL FIBER BREAKER AND METHOD, AND COMBINATION BREAKER AND OPTICAL CONNECTOR

[75] Inventor: John S. Doty, Yucaipa, Calif.

[73] Assignee: The Deutsch Company Electronic Components Division, Banning, Calif.

[21] Appl. No.: 937,722

[22] Filed: Aug. 29, 1978

Related U.S. Application Data

[63] Continuation-in-part of Ser. No. 905,294, May 12, 1978, abandoned.

[51] Int. Cl.³ .............................................. B26F 3/00
[52] U.S. Cl. ...................................... 29/469; 225/96.5; 225/101; 225/105; 350/96.21
[58] Field of Search .............. 225/96.5, 105, 2, 100, 225/101; 29/469, 445, 464; 350/96.2, 96.21; 76/DIG. 11

[56] References Cited

U.S. PATENT DOCUMENTS

| | | | |
|---|---|---|---|
| 2,768,276 | 10/1956 | Arntgen | 219/29 |
| 3,553,905 | 1/1971 | Lemelson | 51/206 R |
| 3,934,773 | 1/1976 | Chinnock et al. | 225/96.5 X |
| 3,981,422 | 9/1976 | Moore | 225/96.5 X |
| 4,017,013 | 4/1977 | Hawk et al. | 225/96.5 |
| 4,027,814 | 6/1977 | Gloge et al. | 225/104 |
| 4,029,390 | 6/1977 | Chinnock et al. | 350/96.21 |
| 4,036,419 | 7/1977 | Hensel et al. | 225/96.5 |
| 4,074,840 | 2/1978 | Fulenwider et al. | 225/96.5 |
| 4,118,862 | 10/1978 | Hansel | 30/124 |
| 4,124,364 | 11/1978 | Dalgoutte | 350/96.21 X |
| 4,159,793 | 7/1979 | Belmonte et al. | 225/96.5 |

OTHER PUBLICATIONS

"Splicing of Optical Fiber Cable on Site", Murato et al., Procedures of the Fiber Communication Conf., London, Sep. 1975.

"Optical Fiber End Preparation for Low-Loss Splices", Gloge et al., May 1973, Bell Sys. Tech. Jour., vol. 52, No. 9.

"Simplified Optical-Fibre Breaking Machine", Hansel, Electronic Letters, vol. 11, No. 24, p. 81, Nov. 27, 1975.

*Primary Examiner*—Milton S. Mehr
*Attorney, Agent, or Firm*—Gausewitz, Carr, Rothenberg & Edwards

[57] ABSTRACT

The present apparatus and method make it extremely easy for a worker, even when located in a manhole or on a telephone pole, to rapidly achieve a perfect break in an optical fiber and at a precisely predetermined position relative to a connector means. The breaking is the same, regardless of the upright, inverted or inclined position of the tool. Only a single motion of the blade is required at any desired speed, and there is no necessity for the blade to contact the fiber at a pressure within certain limits. These and other major results are obtained by clamping an optical connector element to the optical fiber before breaking is effected, and then removably securing the connector element to the breaker at a precisely known position which is correlated to the location of the scoring blade and to the characteristics of the connector. The fiber is then clamped, bent, tensioned and scored in response to a single squeezing and releasing motion by one hand of the operator—these actions being substantially entirely unaffected by excessively hard squeezing forces. The scoring is effected by a hard-mounted tungsten carbide blade which moves, in an arcuate path, toward and across the tensioned fiber. The blade is of a certain type which—when thus moved—causes scoring to occur so instantaneously that, despite the indicated hard mounting, there is almost no danger that the fiber end will be crushed or otherwise damaged. In a second embodiment, means are provided to heat the fiber for rapid burning of the synthetic resin coating therefrom. The invention includes not only the breaker and method per se, but also the apparatus and method whereby the breaker is combined with an optical connector to create a combination breaker and connector.

66 Claims, 20 Drawing Figures

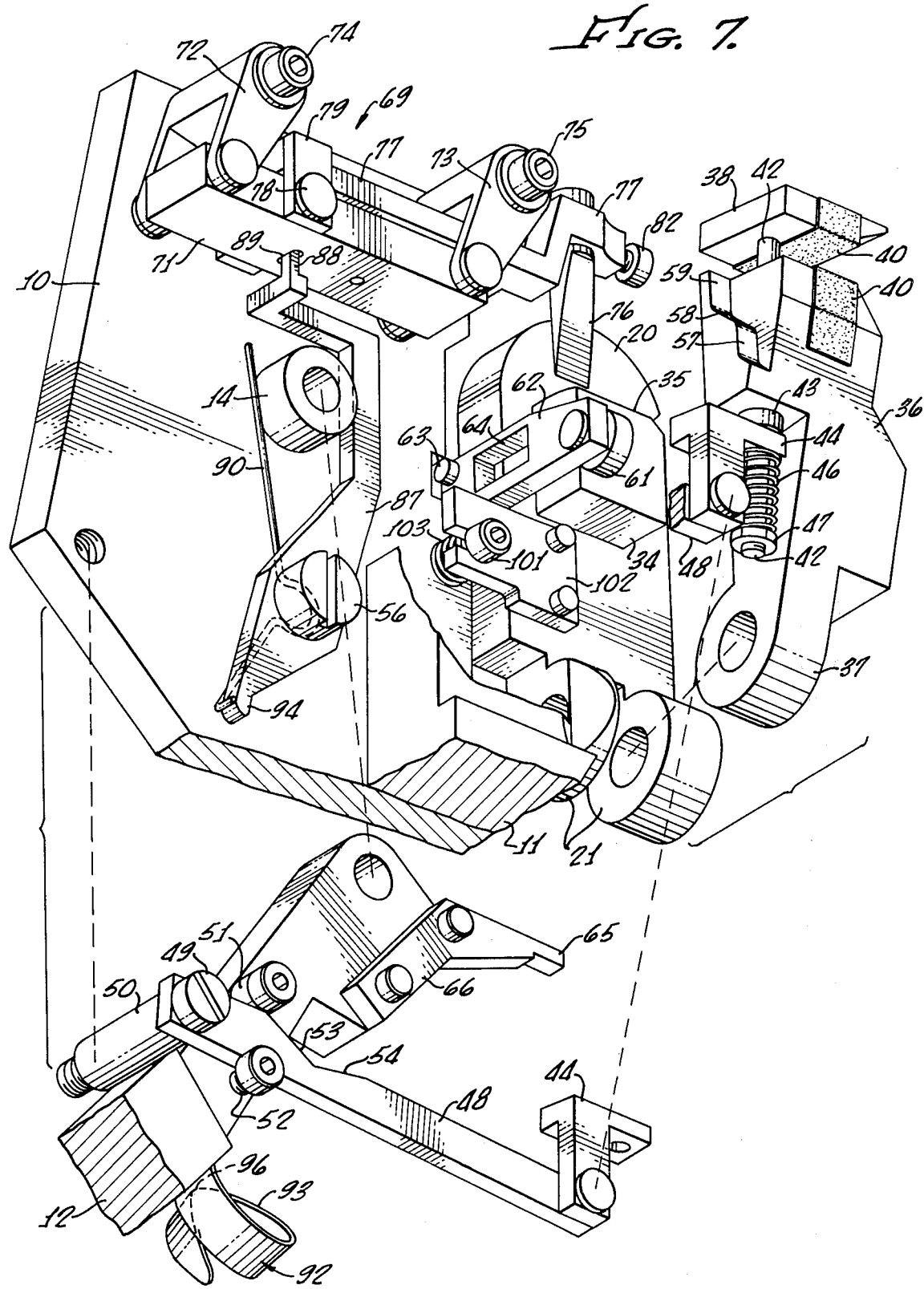

OPTICAL FIBER BREAKER AND METHOD, AND COMBINATION BREAKER AND OPTICAL CONNECTOR

CROSS REFERENCE TO RELATED APPLICATION

This application is a continuation-in-part of my copending application Ser. No. 905,294, filed May 12, 1978, for Optical Fiber Breaker and Method, abandoned.

BACKGROUND OF THE INVENTION

1. Field of the Invention

This invention relates to the field of apparatus and methods for breaking optical fibers in such manner as to achieve substantially perfect mirror-finish ends at the break.

2. Description of Prior Art

In the article by Gloge, Smith, Bisbee and Chinnock (The Bell System Technical Journal, November, 1973, pages 1579 et seq.), it is stated (page 1580) that "The range within which perfectly flat and perpendicular end faces were obtained was found to be so wide that the eventual construction of a simple hand tool for this purpose should present no problem." Nevertheless, the hand tools subsequently created by Bell Laboratories and other major companies have not been commercially practical or successful. That is to say, they have not been such that telephone repairmen, for example, can almost always make a perfect break—even while in a manhole or up a telephone pole—in a matter of seconds if at all. Furthermore, and very importantly, the prior art suggests no practical correlation between the breaker and the optical connectors.

Reference will now be made to some of the important prior-art problems which the present apparatus and method have eliminated. The following is not necessarily all inclusive, nor are the problems necessarily listed in order of importance.

Referring first to scoring, it was conventional in the prior art to lower a scoring blade delicately onto the fiber (either prior to or after tensioning of the fiber). Then, as a second operation, the blade was moved along its length sufficiently to effect scoring or nicking of the fiber. On page 1585 of the cited article, scorer pressures ranging from 1.5 to 7.5 grams are suggested. It is further there stated that the smallest scores were produced when a sharp diamond scorer was lowered onto the fiber after application of tension. A strong preference for diamond or sapphire scorers is typical of most prior art. The prior art also employs, typically, such things as counterweights and/or dashpots to achieve the desired delicate contact between scorer and fiber.

Applicant has discovered that—surprisingly—maximum scorer pressure on the glass may be made to be no factor whatever. Thus, just so long as there is enough pressure to effect scoring, the pressure may be as high as convenient and need not be measured at all. This discovery not only eliminates the need for counterweights, dashpots, measurements, etc., it makes the apparatus and method absolutely independent of orientation (upright, inverted or sideways) in that gravity is of no importance. Additionally, applicant does not require (or even desire) exotic blade material such as diamond or sapphire, having discovered that a certain type of carbide is vastly superior.

Referring next to correlation between the breaker for optical fibers and the connectors therefor, insofar as applicant is aware the prior art suggests no practical means of achieving this major result. Thus, in almost all prior art the breaking and subsequent connecting of the fibers are totally independent operations. In accordance with the present invention, the breaking and connecting apparatus and methods are such as to achieve a breakingconnecting system which not only reduces overall connection time, there being (for example) no need for adhesive, but increases the overall quality of the connection.

With reference to creation of the tension in the fiber, this has conventionally been achieved by (a) predetermined weights, or (b) special "tensator" springs the force of which does not change with distance, or (c) special frictional grips which are intended to slip at a predetermined tension value, or (d) unknown forces which require that, preferably, scoring be effected before tensioning occurs. In the preferred forms of the present apparatus and method, the fiber is clamped in a nonslip manner, tensioning is caused by an economical spring means which is unaffected by excessive grip pressure, and scoring is then performed. There thus result major improvements in the practicality of the tool.

As but one additional example of the deficiencies of the prior art, there is no practical means for insuring that all types and thicknesses of the synthetic resin coating will be removed at regions adjacent the break—this being important for achievement of optimum connections. In accordance with one embodiment of the present apparatus and method, such coating is burned off in the critical areas with no requirement for additional manipulation of the fiber, and with only a small reduction in the speed of the operation.

SUMMARY OF THE INVENTION

In accordance with the scoring aspect of the present invention, the edge of a scoring blade is caused to have initial contact with a bent, tensioned optical fiber in a downward direction and also a scoring direction. There is caused to be sufficient force to score the fiber, but the upper limit of the force need not be measured or known. The blade is one having an edge sufficiently "rough" to score the fiber instantaneously, but sufficiently smooth not to effect improper breaking or damaging of the fiber ends. The blade is so shaped as not to interfere with upward flexing of the fiber ends as soon as breaking occurs. In one embodiment, the fiber is mounted in a groove and has a minimum tendency to roll.

Stated more definitely, the edge of the scoring blade is caused to move through an arcuate path into engagement with the bent, tensioned fiber, the direction of curvature of such path being opposite to that of the fiber surface portion engaged by the scorer. The scorer is cemented tungsten carbide having a particle size typically in the range of one to two microns. The hardness of the carbide is about 92 on the Rockwell A scale.

With reference to the aspect of the invention whereby there is a predetermined correlation to an optical connector for connecting two opposed fiber ends, one element of the optical connector is first quickly clamped to the fiber to be broken, at any position. Then, such connector element is rapidly and removably mounted on the breaker at a predetermined, known position, one characteristic of such position being that the fiber extends beneath the path of the scorer blade. Thereafter, the fiber end is clamped, bent, and scored so as to break at a location precisely known, the break location being correlated in a predetermined manner to the dimensions of the optical connector. Perfect breaking having been achieved at a predetermined location relative to the one optical-connector element, it is only necessary to disconnect such one element from the breaker, repeat the operation with a second connector element and fiber, and then mate the two elements (and thus the fibers) with each other.

In the fiber tensioning aspect of the present method and apparatus, the squeezing of the handles is caused to load a spring means to a force within the range known to create a perfect break. Further squeezing action then releases a tensioning table for shifting a response to such force, thus creating the requisite tension. Very importantly, the spring means and release means are so constructed and related as to nullify the effects of excessive squeezing forces.

When the synthetic resin coating on the fiber is such that strippingback from the broken end does not occur automatically when the break is effected, the tool is caused to be one which has parallel, adjacent heater wires into which the fiber firmly nests and seats upon being tensioned. Switch means, responsive to handle position, create an electric circuit heating the wires and burning off the coating just before scoring occurs. Thus, the ends upon being broken are not enclosed in a coating, and will mate more perfectly in the optical connector.

BRIEF DESCRIPTION OF THE DRAWINGS

FIG. 7 is a greatly enlarged, partially exploded isometric view illustrating various portions of the breaker mechanism, the straight dashed lines indicating parts which are either shown in duplicate (for clarity) or are in alignment with each other;

DETAILED DESCRIPTION

Figure 1:
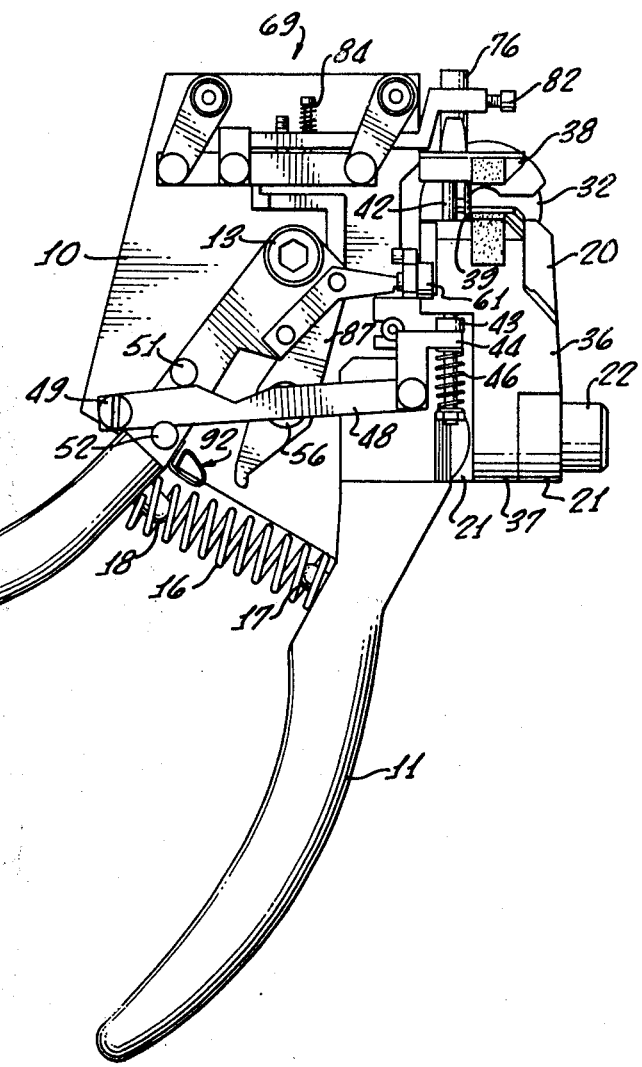
FIG. 1 is a side elevational view of an apparatus constructed in accordance with the present invention.

The present fiber breaker is shown in its upright position and is, for reasons of simplicity, described and claimed as being in that position. It is emphasized, however, that no claim is to be regarded as limited by this convention.

The word "cylindrical" is used, in the present specification and claims, in its conventional sense, namely to mean a right circular cylinder. The optical fibers presently used are cylindrical, as shown at 133 in FIGS. 8, 9 and 11.

In use, the breaker is provided with a cover means which shields most of the illustrated mechanism, such cover means being unshown.

A vertical base plate 10 has fixedly secured thereto, as by screws, a forward handle 11 which may be referred to as the "stationary" handle in that it is anchored to the base plate. A rear handle 12 is pivotally mounted at its upper end to base plate 10, by means of a shoulder screw 13 and spacer sleeve 14 (FIG. 7). The handles are normally held in spaced-apart position by a helical compression spring 16 the ends of which are mounted over studs 17 and 18 on the handles.

Figure 4:
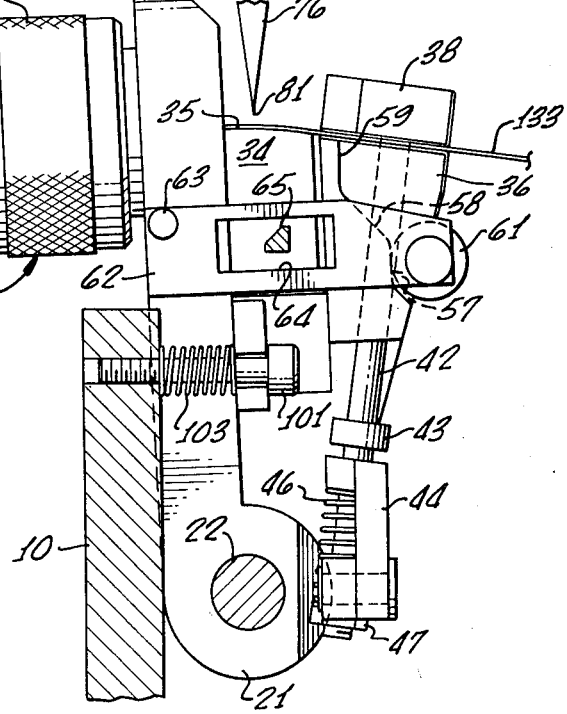
FIG. 4 is a transverse sectional view on line 4—4 of FIG. 3.
Figure 6:
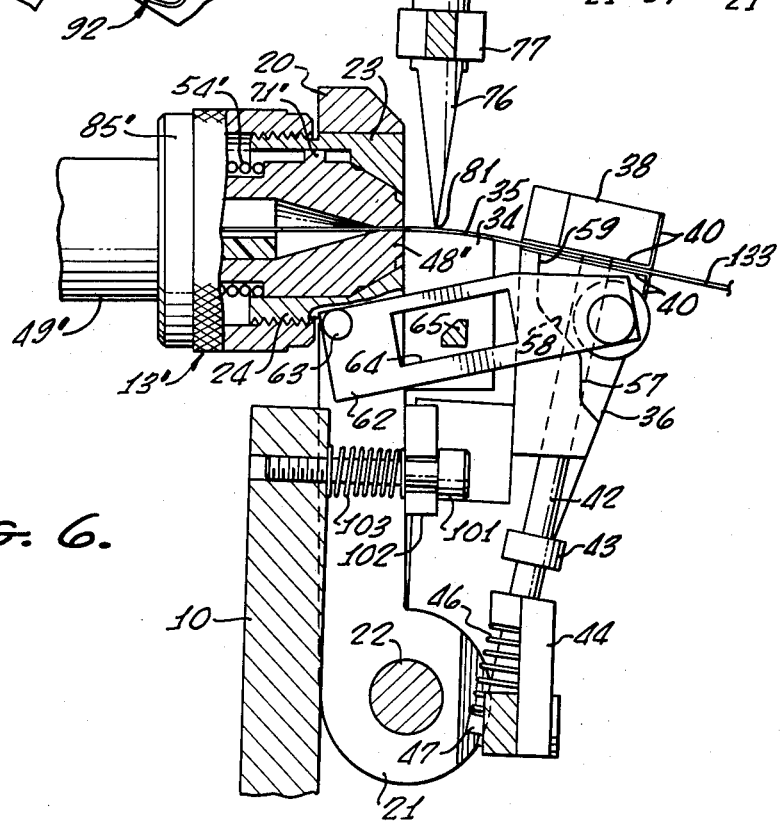
FIG. 6 is a transverse sectional view generally on line 6—6 of FIG. 5, and further showing in section the connector element secured to the breaker.

A plug holder arm 20 is adjustably mounted relative to base plate 10, being a plate-like crank which is normally generally parallel to the base plate as shown in FIGS. 4 and 6. At its lower end, plug holder arm 20 has bearing ears 21 which are apertured to receive a large-diameter and strong shoulder screw 22. The screw 22 is horizontal and parallel to the base plate, and is threaded into an enlarged upper end portion of the stationary handle 11. Thus, the plug holder arm can be pivotally adjusted, through a small angle, about the axis of the shoulder screw for purposes stated below.

As best shown in FIG. 6, a plug receiver 23 is fixedly mounted (as by a suitable adhesive) in plug holder arm 20, and has an externally threaded fastener portion 24. The plug receiver 23 (including its portion 24) is shaped to mate in precise manner with one component (element or portion) 13' of an optical connector assembly which is adapted to achieve a precise optical connection between two optical fibers which have been broken by the present apparatus. As a greatly preferred example of such a connector assembly, reference is made to U.S. patent application Ser. No. 874,558 for Connector for Optical Fibers, and to U.S. patent application Ser. No. 767,692 for Optical Fiber Connector. Both of said applications are hereby incorporated by reference herein as though set forth in full, and application Ser. No. 874,558 is, in part, repeated at the end of the present specification. In such greatly preferred example of a connector assembly, the component (element or portion) 13' is a plug assembly, as described hereinafter relative to FIG. 20 and other figures.

The connector portion 13' includes an internally threaded coupling ring 85' adapted to be threaded around portion 24 until a tapered front shell or plug 48' seats snugly, in complementary manner, in plug receiver 23 as shown in FIG. 6. When thus seated, the forward (right) end of plug or shell 48' is coplanar with the forward surface of the plug receiver 23. Connector portion 13' further includes a clamping and aligning assembly (described below) mounted fixedly around a protective sheath 132 which encloses the actual optical fiber 133. Such assembly effectively clamps the optical fiber, thus the fiber is (when plug 48' is mounted as stated) clamped to the breaking tool.

The plug receiver 23 (FIG. 6) in the present tool is provided with a longitudinal keyway to receive a radial key 71' on shell 48'.

Figure 2:
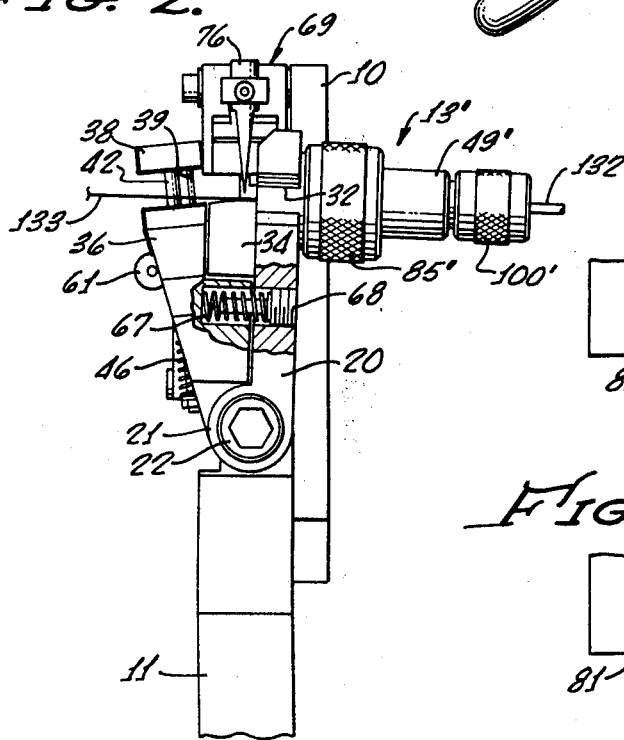
FIG. 2 is an end elevational view thereof, as shown from the right in FIG. 1, a portion being broken away and sectioned in order to show a fiber-tensioning spring.
Figure 5:
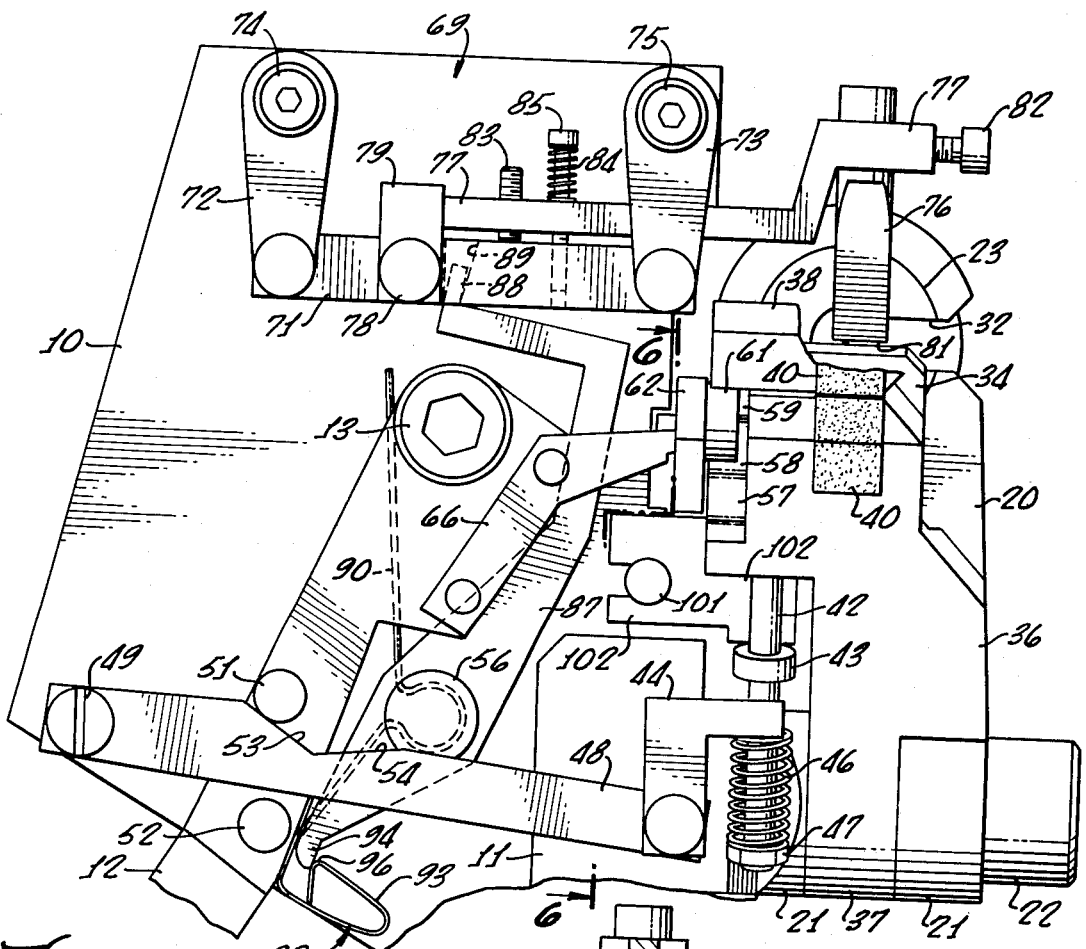
FIG. 5 is a view corresponding to FIG. 3 but showing the blade in a position achieved after completion of a break.

To permit the fiber 133, after the protective sheath 132 has been stripped therefrom, to be inserted laterally into the plug receiver 23 and associated plug holder arm 20, registered radial slots are provided on these elements as shown at 32 in FIGS. 1, 2 and 5.

FIBER CLAMPING, BENDING AND TENSIONING

A fiber support table 34 is fixedly secured to the forward face of plug holder arm 20, and has an upper surface 35 which is cylindrical about the axis of shoulder screw 22. Furthermore, surface 35 is spaced such a distance from screw 22 that there will be a correct degree of bend of the fiber 133 when it is tensioned as described hereinafter. One predetermined radius of surface 35, which is presently employed by applicant to achieve a correct bend, is 1.5 inches from the axis of screw 22 to the cylindrical surface 35.

Table 34 may be made, for example, of a phenolic synthetic resin. Its surface 35 is registered, at the edge adjacent shell 48' (FIG. 6), with the axis of plug receiver 23. This assures that there will be no undesired distortion of or stress in fiber 133 during the tensioning and scoring operations described below.

The protruding end portion of optical fiber 133 extends not only across support table 34 but across a tension table 36 the upper surface of which is flush with surface 35. Tension table 36 is, similarly to plug holder arm 20, a crank mounted pivotally on screw 22. Thus, the lower end of the tension table is an apertured bearing ear 37 which fits between ears 21 of the fiber support, and likewise receives a portion of the shank of screw 22.

Mounted above the upper surface of table 36, in parallel relationship thereto, is a clamp plate 38 from which projects downwardly and slidably into the tension table a guide pin 39 (FIGS. 1 and 2). At their regions opposite plug receiver 23, the opposed surfaces of clamp plate 38 and table 36 are covered with synthetic-resin friction elements adapted to achieve a desired degree of frictional engagement with fiber 133. These friction elements, indicated at 40, may be synthetic resin tape adhesively secured (or bonded) to the clamp and table surfaces. As best shown in FIG. 7, the synthetic resin tape 40 is preferably provided not only on the parallel surfaces of the table 36 and clamp 38, but also on the faces thereof remote from plug receiver 23.

Fiber 133 being in precise position over tables 34 and 36, and beneath plate 38, it is clamped by the actuating, spring, cam and connection mechanisms next described, in response to movement of handle 12 toward handle 11. A tension rod 42 extends downwardly from clamp plate 38 and slidably through an overhanging portion of table 36, having a collar 43 provided fixedly thereon in spaced relationship below the undersurface of the overhanging table (reference being made to FIG. 1, which shows the tool in its "free" position with no hand pressure applied). Collar 43 seats on the upper surface of the horizontal portion of an L-shaped tension link 44. The lower surface of such horizontal portion seats on the upper end of a helical compression spring 46 which is, in turn, seated on a nut 47 (FIG. 3) at the lower end of the tension rod.

The construction of spring 46 is such that, at the instant when link 44 separates from collar 43, there is sufficient clamping pressure between friction elements 40 to prevent any sliding of such friction elements relative to the fiber when a desired predetermined axial tension is applied to the fiber. Furthermore, the force of the spring 46 is such as to supply a substantial portion of such predetermined tension applied to the fiber, it being pointed out that (as shown in FIGS. 2 and 4) the axis of rod 42 does not intersect that of shoulder screw 22 but instead passes to the left thereof (as shown in FIG. 2) so as to create a moment about the shoulder screw axis. This torque or moment tends to pivot tension table 36 counterclockwise as viewed in FIG. 2, thus tensioning the fiber 133. However, the force exerted by spring 46 upon downward movement of link 44 is not sufficient to effect any undesired distortion or crushing of the fiber, the relationships instead being such that the clamping and frictional forces are only barely sufficient to prevent slippage of the fiber between elements 40.

Tension link 44 connects pivotally (in a loose manner, such that the tension table may pivot) to the right end of a tension arm 48, the left end of such arm being pivoted at a screw 49 to a post 50 on base plate 10. Reference is made to FIG. 7, which shows such post 50 and also shows the tension link 44 twice for correlation of different portions of the partially exploded view (there being, in fact, only one link 44 and one arm 48).

Tension arm 48 operates as a cam means, in that it cooperates with upper and lower cam followers 51 and 52 respectively disposed above and below the arm at a location relatively adjacent pivot screw 49. At a region between cam follower 51 and tension link 44, the upper surface of arm 48 is inclined downwardly and then upwardly as shown at 53 and 54 in FIGS. 3, 5 and 7. When the apparatus is in its "free" or fully released position (FIG. 1), no squeezing pressure being applied to the handle means 11–12, the upper cam follower 51 is spaced a short distance from the notch formed by the inclined surfaces 53–54.

When handle 12 commences to pivot counterclockwise in response to initial squeezing action by one hand of the operator, and against the bias of spring 16, the upper cam follower 51 moves toward the upper portion of surface 53. This causes, or permits (depending upon the position of the tool), tension arm 48 to pivot clockwise. Thus, in response to only a very small counterclockwise movement of handle 12, tension arm 48 pivots clockwise to a position close to the one shown in FIG. 3, the clamp plate 38 then having lowered until fiber 133 is in engagement with both of the friction elements 40.

As soon as further counterclockwise pivotal movement of handle 12 causes additional lowering of the tension arm 48, spring 46 is further compressed due to shifting of tension link 44 away from collar 43, creating the predetermined fiber-clamping pressure as stated above. Thus, when the parts are in the positions shown in FIGS. 3 and 4, fiber 133 is properly clamped and will not slip when tensioned. The words "further compressed" are used in this paragraph because the spring 46 is preloaded between link 44 and nut 47, there being compression of the spring even when the tool is in the free position of FIG. 1.

It is possible for handle 12 to be pivoted all the way counterclockwise until it strikes a shoulder screw 56 which serves as a stop (as well as performing other functions stated later in this specification). Because of the construction of the present mechanism, even such full movement of handle 12 until shoulder screw 56 is engaged will not create excessive clamping pressure on the fiber, or excessive tensioning of the fiber, because the inclined surface 53 of tension arm 48 is so shaped and oriented that tension link 44 stands substantially still at all times when cam follower 51 is shifting between the position shown in FIG. 3 and the position of such cam follower when the handle means is fully closed against screw 56 (cam follower 51 then being relatively adjacent to—but not yet at—the region of intersection of surfaces 53–54). Thus, both the clamping pressure and the fiber-tensioning force are immune to the effects of squeezing of the handles more than the necessary extent.

Figure 3:
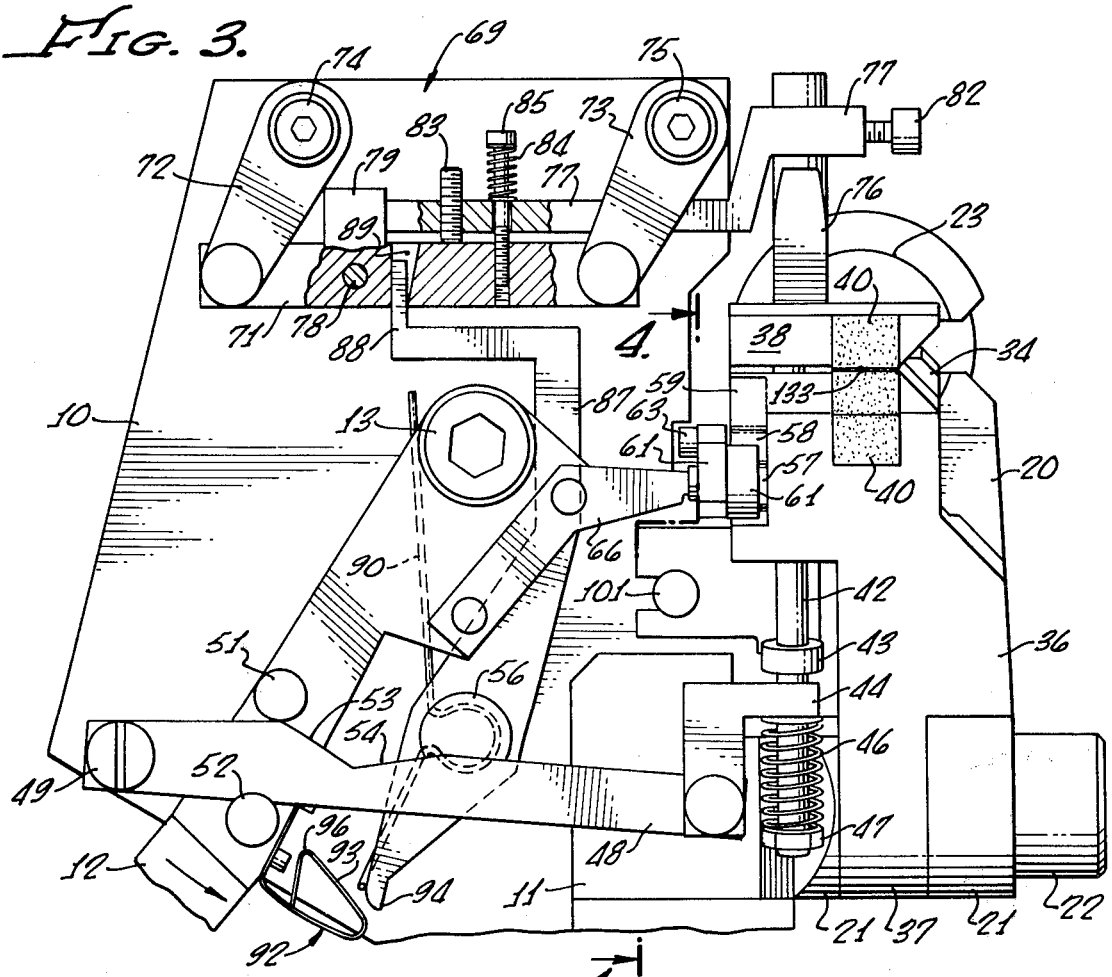
FIG. 3 is an enlarged view of the upper portion of FIG. 1, but showing the fiber in clamped condition.

After handle 12 pivots counterclockwise from the free position of FIG. 1 to the initial clamping position shown in FIG. 3, link 44 having just separated from shoulder 43 to provide the requisite clamping and tensioning force in rod 42, there is still no axial tension created in the fiber since cam and cam follower means are provided to prevent any pivotal motion of tension table 36 until after the fiber is fully and properly clamped. As best shown in FIG. 7, the cam means comprises a lower cam surface 57, an intermediate cam surface 58, and an upper cam surface 59 all formed integrally on tension table 36. The lower and upper surfaces 57 and 59 are very steeply inclined, being substantially vertical as shown in FIGS. 4 and 6. Intermediate surface 58, on the other hand, is gently inclined upwardly and to the left as viewed in FIGS. 4 and 6 (toward back plate 10). A cam follower roller 61 is rotatably mounted at the forward end of what may be termed a tension actuator arm 62, the rear end of such arm being pivoted at 63 to a screw which extends into plug holder arm 20.

In an intermediate portion of tension actuator arm 62 there is provided a large opening 64 in which is disposed at all times the relatively small end 65 of an arm 66 which is secured by screws to the upper end of handle 12. The size of such small end 65 is correlated to the vertical distance between the upper and lower walls of opening 64 in such manner that there is a predetermined lost-motion connection provided between the end 65 and actuator arm 62.

Cam follower roller 61 prevents pivoting of tension table 36 when the upper cam follower 51 has just reached the position of FIG. 3 (handle 12 pivoting counterclockwise), since the roller is then engaging the lower steep cam surface 57 as shown in FIG. 4. It is emphasized that the initial squeezing motion of handle 12 toward handle 11 does not lift roller 61 off this steep cam surface 57 due to the indicated lost-motion connection at 64–65, the result being that operation of the handle to clamp the fiber does not cause any tensioning thereof. Additional counterclockwise motion of handle 12 causes handle arm end 65 to engage the upper portion of actuator arm 62 and effect counterclockwise pivoting of such arm from the position shown in FIG. 4 to a higher position (similar to that shown in FIG. 6) at which roller 61 reaches inclined portion 58 of the cam means.

Tension table 36 then, immediately, springs to the right as viewed in FIGS. 4 and 6, there being pivotal motion of the table about the axis of screw 22. If unimpeded, such pivotal motion would continue until the upper steep cam surface 59 is engaged by roller 61. However, this does not occur since the fiber itself prevents such extreme pivotal movement of the tension table. Instead, the tension table only pivots a short distance away from fiber support table 34 because only a relatively small amount of pivoting is sufficient to create the desired tension in fiber 133.

The tensioning motion of table 36 is effected not only due to the torque arm described above, and the pressure of spring 46, but due to the pressure of a second helical compression spring which is shown at 67 in FIG. 2. Such spring is in a recess in the tension table, and seats at its outer end on an adjustable plug 68 threaded into plug holder arm 20. The setting of plug 68, and the size of spring 67, are caused to be such that the combined forces of springs 67 and 46 create precisely the desired predetermined degree of tension in the fiber 133. For a fiber 133 having a diameter of 0.005 inch, this tension is preferably about 150 grams.

Because the tensioning movement of table 36 is pivotal, not straight, the tensioned fiber conforms closely to cylindrical surface 35 (FIG. 4) regardless of the position of table 34, the position of such table being adjustable as described below. The lost-motion opening 64 in element 62 is so wide that any lateral motion of the handle 12—caused by the squeezing action—does not affect fiber tension at all.

The above-described mechanism effects the predetermined clamping, tensioning and bending of fiber 133 in a very short period of time, which can be a small fraction of a second when the operator pivots handle 12 rapidly toward handle 11. Accordingly, the fiber is ready for scoring by the precision scoring mechanism next to be described.

SCORING OF THE FIBER

As best shown in FIG. 7, the scoring mechanism comprises a highly rigid and stable (against lateral forces) parallelogram linkage 69 consisting of a horizontal bottom link 71, end links (rocker arms) 72 and 73 which are pivotally mounted, respectively, on shoulder screws 74 and 75 extending into base plate 10, and an upper link which is formed by the base plate itself but may be considered as extending horizontally between the shoulder screws.

As illustrated, the bottom link 71 is strong and thick, and the end links 72–73 are U-shaped and securely pivoted both to the shoulder screws and to the bottom link. The strength and rigidity of the parallelogram linkage 69 are for the purpose of preventing lateral movement of a scoring blade 76 which is mounted substantially vertically, and in adjustable relationship, in a blade arm 77. Arm 77, in turn, extends above and substantially parallel to bottom link 71, being pivoted to such link at 78 by a U-shaped bracket 79.

Blade 76 is, very preferably, a tungsten carbide wedge the sharp lower edge 81 of which effects scoring of the fiber. The elevation of scoring edge 81 above the cylindrical upper surface 35 of fiber support table 34 may be adjusted in two ways: Firstly, by loosening a set screw 82 and moving the blade upwardly or downwardly relative to the blade arm 77, and secondly, by turning a fine-adjustment set screw 83 which is threaded vertically through arm 77.

When set screw 83 is so rotated as to move downwardly, it bears against the upper surface of link 71 and thus effects a slight counterclockwise pivoting of blade arm 77 about pivot 78. This pivoting is against the bias of a helical compression spring 84 which is mounted around a screw 85 as shown in FIG. 3. Such screw extends downwardly through an oversize opening in blade arm 77 and is threaded into the horizontal link 71, so that rotation of the screw 85 changes the spring bias.

To operate linkage 69 for achieving scoring of the fiber by blade edge 81, a trigger 87 is provided in the form of a first class lever. The fulcrum of the lever is the above-indicated shoulder screw 56 (reference being made to FIG. 7). The region of the trigger above screw 56 extends adjacent base plate 10 (behind handle 12), terminating in a generally vertical upper end portion 88 which fits in an opening 89 in lower link 71. To bias trigger 87 in a counterclockwise direction, thus maintaining the link 71 in its leftmost position (FIGS. 1, 3 and 7) except during the actual scoring operation, a spring wire 90 is provided. Such spring is best shown in FIG. 7, and has one leg seated to the left of spacer sleeve 14, a U-shaped central portion looped around the stem of shoulder screw 56 beneath trigger 87, and a lower portion which extends downwardly to the lower end of the trigger and thence upwardly for engagement with the left side thereof. Excessive counterclockwise movement of the trigger is prevented by sleeve 14 (FIG. 7) which acts as a stop.

Referring to FIGS. 3, 5 and 7, a trigger clip or actuator 92, in the form of a curled flat spring which provides a cam and escapement function relative to the lower end of the trigger, is mounted on handle 12 by means of suitable screws. Clip 92 has an inclined upper surface 93 which extends upwardly and to the left as viewed in FIGS. 3 and 5. Such surface is adapted to engage a narrow lower "dog" portion 94 of the trigger in response to counterclockwise pivotal movement of handle 12 past the position shown in FIG. 3 (which FIG. 3 position achieves fiber clamping as described above).

Sufficient counterclockwise handle movement causes lower portion 94 to ride up surface 93 and thus bend the clip downwardly, so that an upper corner 96 of the clip moves beneath the portion 94. The clip then springs upwardly to the position shown in FIG. 5, thereby retaining the lower trigger end (portion 94) to the left of clip corner 96 during a substantial portion of clockwise pivotal movement of handle 12. However, long before the handle 12 returns (clockwise) to its free position of FIG. 1, the clip corner 96 escapes from behind lower trigger portion 94 and thus frees the trigger. The shape and strength of clip 92 are such that it will pivot trigger 87 just far enough to effect scoring, following which the trigger releases from the clip.

Let it be assumed that handle 12 is pivoting counterclockwise and is in the FIG. 3 position (the fiber end 133 having been clamped, tensioned and bent as described). Continued counterclockwise pivotal movement causes the clip to ride beneath trigger portion 94 as stated, until the clip springs upwardly to the FIG. 5 position with corner 96 on the right side of portion 94 of the trigger. The operator can then, in accordance with his wishes and characteristics, either pivot the handle 12 counterclockwise until shoulder screw 56 is engaged by the handle 12, or he can immediately release the handle so that it pivots clockwise in response to the bias of spring 16 (a clicking noise informs the operator when clockwise handle movement may be started). In either case, nothing happens until the clip corner 96 effects clockwise pivoting of trigger 87 against the bias of spring 90, the upper portion 88 of the trigger then shifting link 71 to the right from the FIG. 3 position to the FIG. 5 position. This causes scoring edge 81 of blade 76 to score fiber 133, whereupon breakage of the fiber instantly results to achieve perfect mirror-finish optical ends of the broken fiber portions (each end being perpendicular to the fiber axis). Continued clockwise movement of handle 12 causes the lower portion 94 of the trigger to ride over the clip as stated, whereupon the trigger is released so that spring 90 instantly pivots the trigger counterclockwise to shift link 71 back to the position of FIG. 3, blade 76 and its scoring edge 81 then being out of the way and remote from the broken fiber end which is still projecting from shell 48' (FIG. 6).

FIG. 5 shows the parts at the instant when the clockwise-moving handle 12 is about to cause release of trigger end 94 from clip 92. Thus, the blade 76 is shown in its right-most position, the end links or rocker arms 72-73 being substantially vertical.

It is to be noted that the end links 72 and 73 of linkage 69 are normally (when the tool is in its free position, FIG. 1) pivoted clockwise, to the left of their vertical positions, being held there by the spring 90 and by the stopping function of sleeve 14 (FIG. 7) relative to the trigger. Thus, link 71 and its associated blade arm 77 and blade 76 are higher than, and to the left of, the fiber 133 (a typical "free" elevation of the scoring edge 81 being that shown in FIG. 4). Blade 76 does not, therefore, interfere in any way with mounting of the connector portion 13' (FIG. 6) to the plug receiver 23 which automatically effects positioning of the random-length fiber end 133 on table 34.

Figure 8:
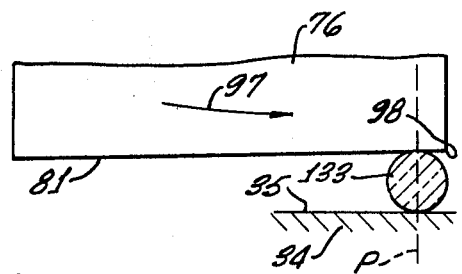
FIG. 8 is a greatly enlarged schematic view showing the lower edge of the scoring blade at the instant it first contacts an optical fiber.
Figure 9:
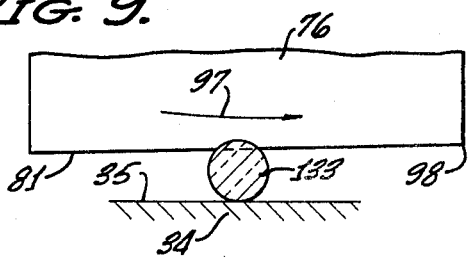
FIG. 9 is a corresponding schematic view illustrating the blade in a position achieved after completion of the break. In both FIGS. 8 and 9, the diameter of the fiber is, for clarity, shown greatly exaggerated in comparison to the length of the scoring edge.

When trigger 87 is actuated clockwise, link 71 (and thus the scoring edge 81 of blade 76) moves downwardly and to the right in an arcuate path, as indicated by the arcuate arrows 97 in schematic FIGS. 8 and 9 (drawing sheet 1). The lengths and positions of links 72, 73, and the adjustment of blade 76, are caused to be such that the forward end of scoring edge 81 (namely, the corner 98 shown in FIGS. 8 and 9) does not ever engage fiber 133. Instead, the fiber is first engaged after it is certain that such corner 98 has passed over and beyond the fiber in the rightward direction during the movement represented by FIG. 8. A typical first-engagement position is shown in FIG. 8.

The curved downward and rightward arcuate movement represented by arrows 97 continues until, for example, the fiber is at approximately a central or left region of the blade. Furthermore, the movement is such that scoring edge 81 is substantially (for example, one-quarter the diameter of the fiber) beneath the upper surface of the fiber. However, it is emphasized that the fiber has broken long before the position of FIG. 9 is reached—having instead broken when the blade has moved only a slight distance away from the FIG. 8 position.

Breaking is the result of the tensioning, curvature, and scoring which are effected in rapid sequence by the present tool. All of the operations can be effected very quickly, with the operator moving handle 12 just as rapidly as he desires.

With the described mechanism, no movement of the hand of the operator can effect any side (lateral) loading movement of blade 76, which is an important feature relative to the precision location of the break as described below.

One of the highly surprising and unexpected results of the present scoring mechanism and method is that blade 76 may be "hard mounted" instead of precision loaded (as by counterweights, fine springs, etc.) to a precise bearing pressure. In other words, the spring 84 may be very strong, so strong that under no conditions, except in response to the turning of set screw 83, will there be any movement of blade arm 77 relative to link 71. The fiber does not "know" whether or not blade 76 is associated with any spring or weight whatever. The hard mounting permits the tool to be used in any position, which is one of its important features.

The described motion of the blade edge 81 is along a curved path, which path lies in a plane substantially perpendicular to the axis of the fiber 133 at the region of scoring. Furthermore, the curved path intersects the curved surface of the fiber in the indicated plane, and the degree of intersection is caused to be such that there will be a clean break of the fiber. As indicated by arrows 97, FIGS. 8 and 9, the curved path is in an opposite direction to the curvature of the upper region of the fiber 133, in that the indicated upper fiber region is convex upwardly whereas the arrows 97 are convex downwardly.

It was very common in the prior art to move a scoring blade directly downwardly (vertically) against a fiber such as fiber 133, and with a precision amount of force (a small number of grams). Thus, in the indicated prior-art method, the path of the scoring blade was parallel to or coincident with the longitudinal diametral plane of the bent fiber. Such "longitudinal diametral plane of the bent fiber" is indicated by the dashed line "P" in FIG. 8, being the vertical plane through the fiber axis along the length of the bent fiber on the support table 34. In contrast to such prior-art method, the initial engagement of the blade edge 81 of the present apparatus with fiber 133 is achieved by moving the blade edge along a downward, inclined path which is at a large acute angle to the indicated "longitudinal diametral plane." The initial engagement is such that the bent fiber is first engaged on its side remote from supporting surface 35.

It will thus be seen that in accordance with a scoring aspect of the present invention, the edge of a scoring blade is caused to have initial contact with a bent (about a predetermined radius), tensioned optical fiber in a downward direction and also a scoring direction. There is caused to be sufficient force to score the fiber, but the upper limit of the force need not be measured or known.

Preferably, the scoring edge is slightly inclined, upwardly and to the right, as shown in FIGS. 8 and 9. Thus, front corner 98 is a few thousandths of an inch higher than is the rear corner of the blade edge.

The construction of the scoring blade (76 in the described structure) is highly important. As above indicated, the blade 76 is formed of a carbide, very preferably tungsten carbide as stated above. The particular tungsten carbide employed is critically important to the achievement of the instant one-stroke breakage. Applicant has discovered that the grain structure should be sufficiently small that the edge 81 may be ground very sharp. On the other hand, the grain structure should be sufficiently large that—when greatly magnified—the edge 81 will appear to be rough, as shown in FIG. 10 which schematically represents an electronmicroscope "picture" at a 2500X magnification.

Figure 10:
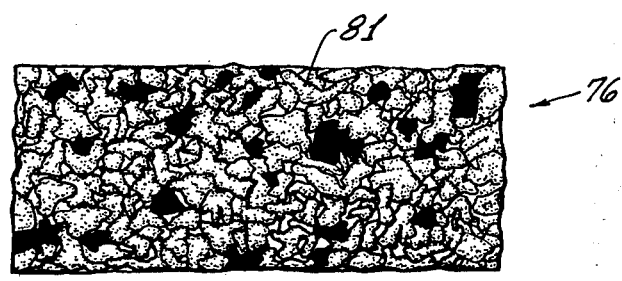
FIG. 10 is a schematic representation of an electronmicroscope enlargement of the edge of the scoring blade.

In FIG. 10, the width of the edge 81 of blade 76 is approximately 0.0005 inch. This edge is formed by grinding (as by a diamond grinding wheel) the opposed angled faces of the blade to the sharp edge. Then, the edge itself may be very lightly sanded with fine sandpaper (e.g., 600 grit). The particle size of the tungsten carbide as shown in FIG. 10, is typically about 1.25 microns, and ranges generally between one and two microns.

The hardness of the tungsten carbide is about 92 on the Rockwell A scale (between about 91.7 and 92.2). The chemical composition is 94% tungsten carbide, cemented together at elevated temperature by 6% cobalt. The described cemented tungsten carbide may be purchased from the Carbolloy Systems Department of General Electric, Detroit, Michigan, as "Grade 883."

It is pointed out that if the edge of the blade is not so composed and constructed as to effect immediate scoring when the curved, tensioned optical fiber is initially contacted in the scoring direction, breaking will not occur immediately and the above-described great advantages of single movement and "hard mounting" may not be achieved. Instead, for example, the ends may be crushed or otherwise damaged or unsatisfactory.

Referring next to another aspect of the scoring blade, the angle of at least the lower parts of faces 110, 111 (FIG. 11), relative to each other, should be so small that they will not be contacted in any manner damaging to the mirror faces of the broken ends.

In the present tool it has been found satisfactory to make this angle 15 degrees, with each face 110, 111 being at an angle of 7.5 degrees from the vertical. Alternatively, the blade face relatively adjacent the optical connector (plug) element 48' (FIG. 11) may be vertical. It is emphasized that the blade face relatively adjacent plug 48' is the most important, in that the right section (FIG. 11) of the broken fiber is discarded.

Figure 11:
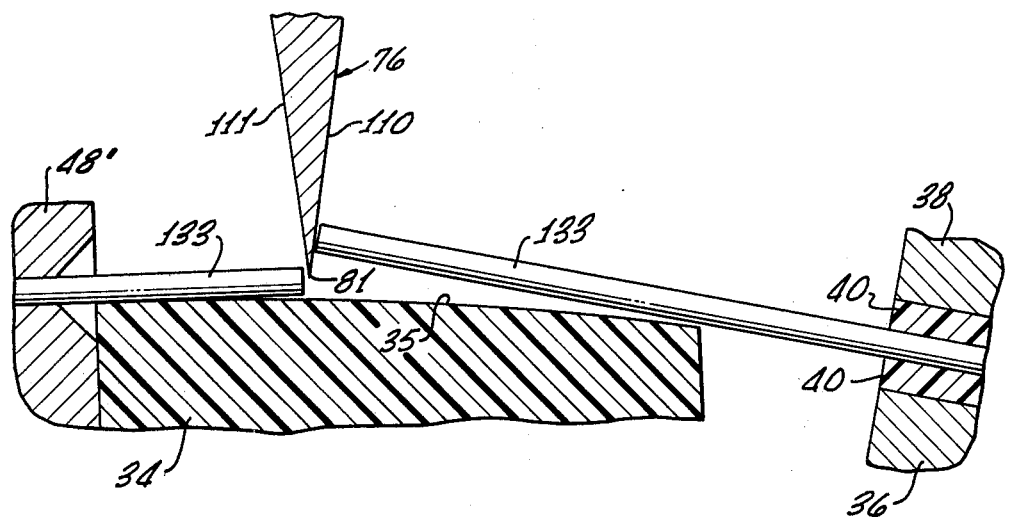
FIG. 11 is a greatly enlarged vertical sectional view illustrating the action of the fiber ends just after the instant of breaking.

FIG. 11 shows, in greatly enlarged form, how the broken ends spring up or "pop up" from surface 35, due to the elasticity of the glass, at the instant breaking occurs. In thus popping up, the mirror ends tend to retract away from the faces 110, 111 of the blade, and are not damaged by such faces. Since the critical fiber end, the left one as shown in FIG. 11 and which protrudes from plug 48', does not rest on surface 35 except at the instant of initial scoring, the downwardly moving blade 76 does not tend to crush or otherwise damage such fiber end, even though the blade is hard mounted as described. Thus, the blade shape, blade material, and blade direction cooperate in the achievement of single-stroke rapid fiber breaking, and without the necessity of limiting blade pressure. The retraction shown at the left in FIG. 11 is aided by the long length of fiber between the break region and the clamp portion of the optical connector.

METHOD AND APPARATUS CORRELATING THE BREAKER AND OPTICAL CONNECTOR

As previously stated, the present optical fiber breaker is not only adapted to be employed by itself but, additionally, is part of an overall system including the optical connector means referred to in connection with FIG. 6 and described below relative to FIGS. 15-20. In such connector, and in some other connectors, it is highly important that there be a precisely predetermined amount of extension of the broken fiber out of the connector plug portion (such as 48', FIG. 6). In accordance with the present apparatus and method, a random length of fiber (as shown in FIG. 6) is inserted into the breaking tool, but as soon as breaking has occurred there is a precisely predetermined length which is (according to a major aspect of the present invention) correlated accurately to the characteristics of the particular optical connector so as to achieve an optimum optical connection.

It has previously been described how the position of blade 76 relative to the connector portion (for example, plug or shell 48', as shown in FIG. 6) is critical. There will now be described how this precise distance from the forward face of shell 48' to the scoring edge of blade 76 may be accurately adjusted without in any way changing the optical characteristics of the break.

As previously set forth, the plug holder arm 20 is pivotally mounted on shoulder screw 22 for forward and rearward pivotal movement. Furthermore, the upper surface 35 of fiber support table 34 is cylindrical about the axis of shoulder screw 22. In addition, the linkage 69 and the mounting of blade 76 are such that, at all times, scoring edge 81 lies in a plane which contains the axis of screw 22 and also contains that radius of surface 35 which passes through scoring edge 81. Scoring edge 81 therefore always moves in a plane perpendicular to the axis of fiber 133 (that is to say, the axis of that portion of the fiber which is directly beneath edge 81 on table 34) to thus make perfect breaks, causing the end faces of the broken fiber sections to be perpendicular to the fiber axes.

With the described construction, the distance from edge 81 to the front face of plug or shell element 48', FIG. 6, and accordingly the amount of protrusion of the broken-off fiber end from element 48' after the break, may be precisely controlled by shifting the plug receiver 23 and its associated connector element relative to the blade. Such shifting is effected by turning a screw 101 (FIGS. 6 and 7) which extends through an opening in a bracket 102 and is threaded into base plate 10. Bracket 102 is mounted on plug holder arm 20, and a helical compression spring 103 forces it out (to the right in FIG. 6) to the maximum extent permitted by screw 101.

It follows that by turning screw 101 one way or the other, plug holder arm 20 and thus the connector portion 13' and also the table 34, are shifted inwardly or outwardly relative to scoring edge 81 to thereby change the distance of such edge from the inner face of plug or shell 48'. Regardless of the adjustment effected by turning of screw 101, the blade is perpendicular to the exact portion of fiber 133 which is broken, and the end faces of the break are perfectly perpendicular to the fiber axes of the broken components. Because of the characteristics of linkage 69 and associated components, the position of blade 76 relative to base plate 10 is fixed, even after long use of the mechanism, there being minimal play or slop in a lateral direction (to left or right in FIG. 6). Thus, the amount of protrusion of the broken fiber end from element 48' may be controlled within close tolerances such as those on the order of one thousandth of an inch.

As above stated, the particular and greatly preferred optical connector which is employed in conjunction with the present tool is shown further in FIGS. 15-20, and described in detail at the end part of this specification. As is there set forth, the protective sheath 132 around fiber 133 is first stripped away at an end portion of the fiber (as by a cable stripper), following which the plug assembly 13' is mounted on the fiber. A back shell nut 100' is turned to grip the fiber between resilient pads 102' and 103', thus clamping the fiber in plug assembly 13' without damaging the fiber. Then, when the random-length protruding end of the fiber is inserted in the breaking tool as described above, and ring 85' is turned to fully seat plug assembly 13' on plug receiver 23 (FIG. 6).

Figures 15, 17:
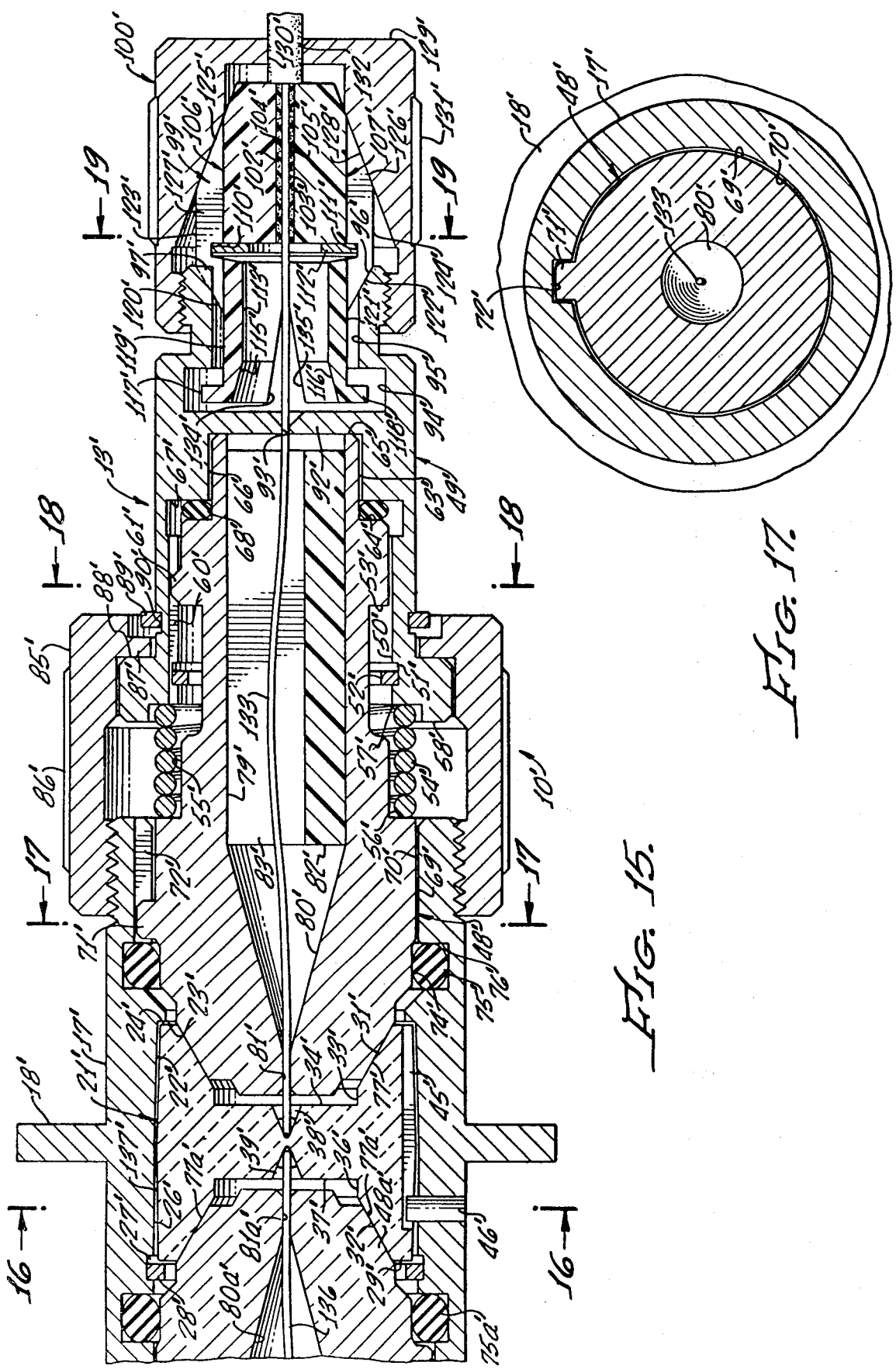
FIG. 15 is an enlarged fragmentary longitudinal sectional view of the preferred optical connector.
FIGS. 16, 17, 18 and 19 are transverse sectional views taken along lines 16—16, 17—17, 18—18 and 19—19, respectively, of FIG. 15.
Figure 16:
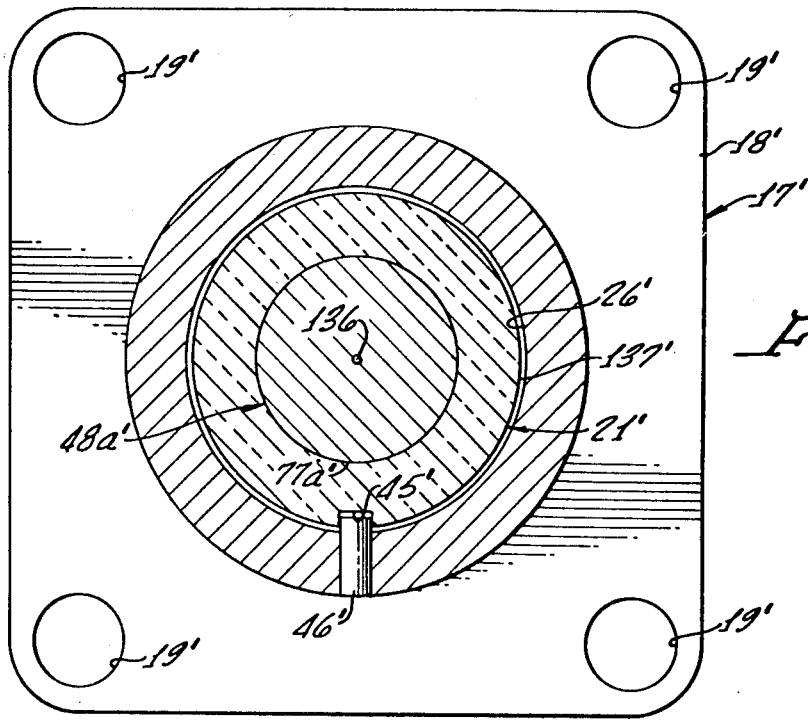
Figure 18:
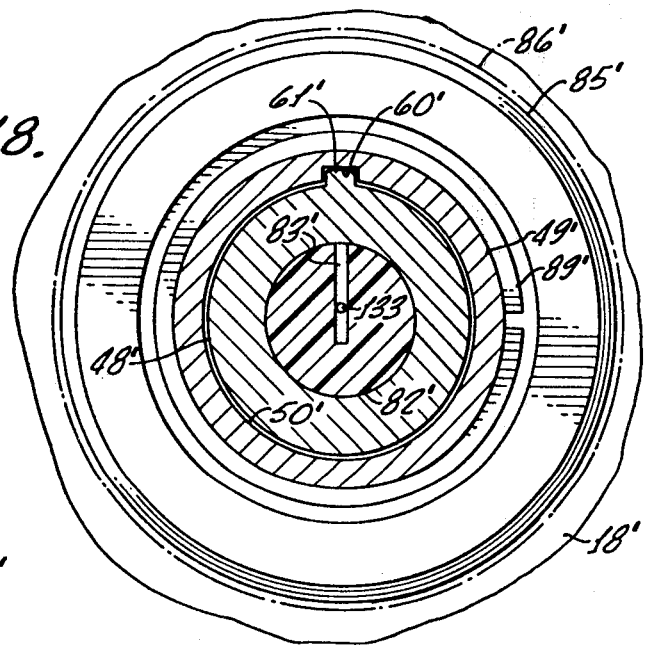
Figure 19:
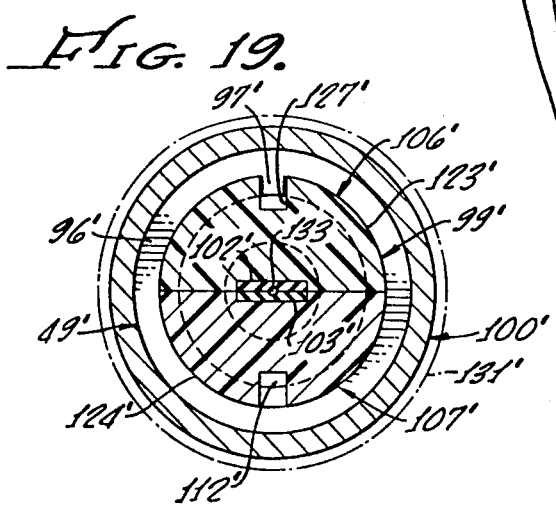

The fiber is thus effectively clamped at a known position relative to the breaking tool. Then, when breaking occurs at a precisely determined position relative to the forward shell (plug) 48', as described, the correct relationship will be present after assembly 13' is unthreaded from the breaker and threaded to a further shell portion 17' of the optical connector (FIG. 15).

Due to the action of a spring 54', and the fact that the broken fiber only projects a limited distance out of shell 48', unthreading of ring 85' from the breaking tool causes the broken end to retract completely into the plug or shell 48' so as to be substantially immune to damage or contamination. As soon as ring 85' is threaded to element 17' of the connector (FIG. 15), the broken end again projects to just the right extent for making of the optical connection.

The present tool has the capability of being easily changed for different diameters of optical fibers 133, and even for different connectors, by making various adjustments, changing the plug receiver 23, etc. The tool as described above (without making such changes or adjustments) is especially intended for use with the described optical connector, and for breaking a particular fiber 133 having a thin synthetic resin coating which automatically strips back a slight distance in response to fiber breaking. Such fiber 133 has a two-layer high-silica glass body the outer diameter of which is about 125 microns, and an acetate coating the outer diameter of which is in the range of 132 to 138 microns. This exemplary fiber 133 is manufactured by Corning Glass Works, Corning, New York, under identification numbers 5040 and 10020.

There exist types and thicknesses of plastic coatings, on optical fibers, which do not strip back automatically from the glass body in response to breaking, and it is an important feature of the present tool that it is readily adapted for quickly burning off such coatings from the break region.

THE SECOND EMBODIMENT—FOR BURNING OFF THE COATING

Except as specifically stated below, the second embodiment is identical to the one described above.

Figure 12:
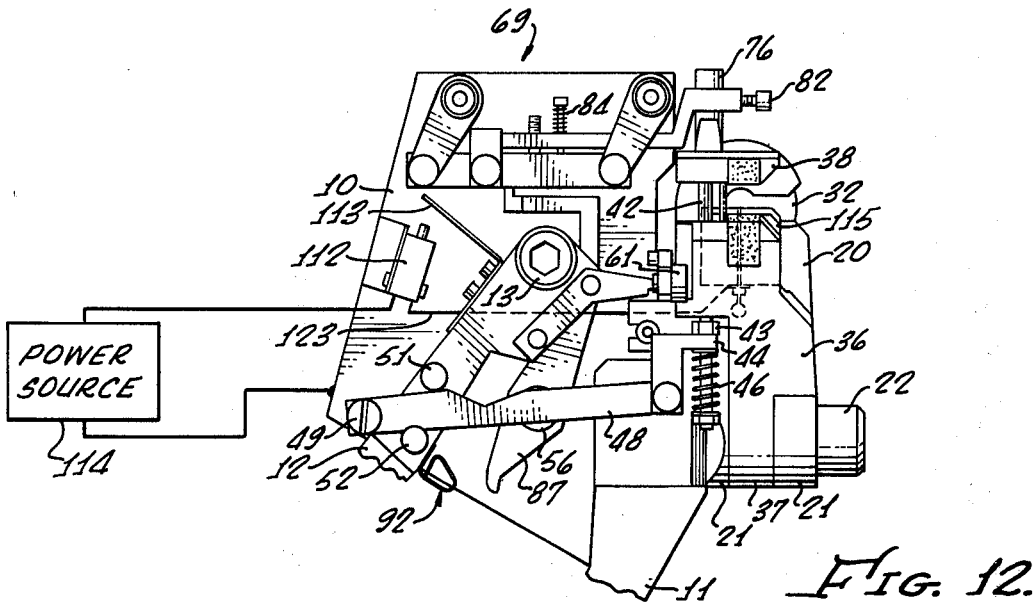
FIG. 12 is an elevational view corresponding generally to the upper portion of FIG. 1 but illustrating the fiber-heating means of a second embodiment of the breaker.
Figure 13:
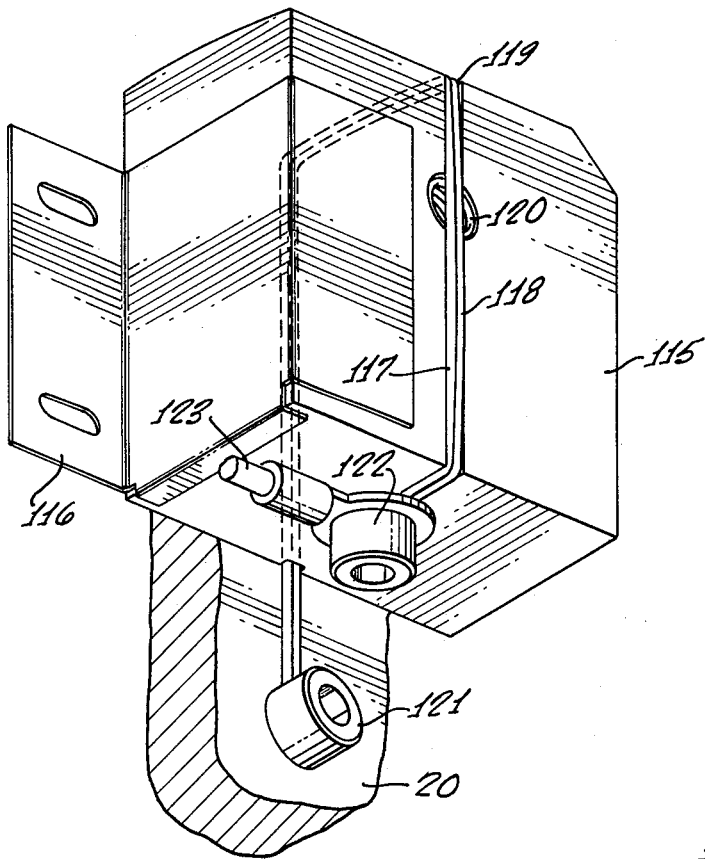
FIG. 13 is an enlarged isometric view illustrating the fiber support table of such second embodiment, the table incorporating heating wires defining a groove in which the fiber nests.
Figure 14:
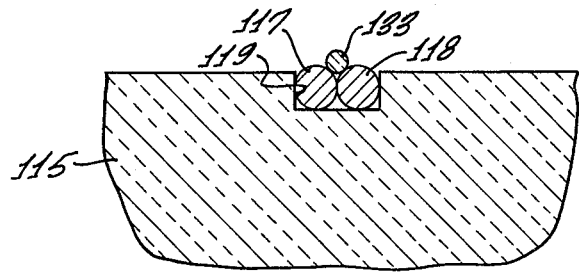
FIG. 14 is a further enlarged vertical sectional view illustrating the relationship between the heating wires and fiber in the vicinity of the point of scoring.

Referring to FIGS. 12-14, inclusive, a switch is shown at 112 and is suitably mounted to back plate 10 adjacent the upper portion of handle 12. A spring-metal angle member 113 is mounted on handle 12, by means of screws, being adapted to close switch 112 (which is normally open) when the handle 12 is shifted counterclockwise to a predetermined substantially closed position. Such predetermined position corresponds to a position of handle 12 which is somewhat counterclockwise from the position shown in FIG. 5.

It is only necessary for the operator to maintain handle 12 in the indicated substantially-closed position until the synthetic resin has been burned off the glass fiber 133 by the heater wire means next described. Heating of the wire means, and by the wire means, takes place during the entire period when switch 112 is thus closed—there being a battery 114 and suitable leads provided for this purpose.

FIG. 13 shows a ceramic block 115 which is used in place of block 34 as the fiber support table. Such block is secured to plug holder arm 20 by metal brackets 116 and suitable screws, not shown.

Two heater wires 117 and 118 are mounted in a groove 119 (FIG. 14) in the upper surface of block 115. The wires may, for example, be formed of Invar alloy. The wires are in line contact with each other, and at their upper regions lie generally (except for curvature described below) in a horizontal plane immediately adjacent and parallel to the fiber support portion of table 115. Each wire 117, 118 may, for example, have a diameter of 0.010 inch.

As shown in FIG. 14, the optical fiber 133 nests in and parallel to the "notch" or groove formed by upper surface portions of wires 117 and 118. Then, when the heater circuit is completed, the fiber is rapidly heated so that the synthetic resin coating burns off in the region where scoring will occur.

After such burn-off, the operator merely releases handle 12 so that it is forced out by spring 16, thus instantly causing scoring and fiber breaking as described heretofore. The scoring blade is so set that the heater wires are never engaged thereby.

It is emphasized that groove 119 has a bottom wall which is curved, at a radius of about 1.5 inches, about the axis of screw 22. The wires 117, 118 therefore also curve, so the fiber 133 seated therein is tensioned and bent about a 1.5 inch radius as described relative to the first embodiment.

Extensions of groove 119 are provided down the front and back faces of block 115, and also contain extensions of wires 117, 118. A helical compression spring 120 is mounted in a recess in the front face, and bears outwardly against the wires to insure that they are under tension. Thus, any change in the lengths of the wires, caused by heating, is compensated for by spring 120 so that the wires always lie closely against the curved bottom wall of groove 119 at the upper side of the block.

A screw 121, FIG. 13, connects the wires to arm 20, so that a "ground" circuit is completed through the tool to one side of the power source 114. A second screw 122 connects to a lead 123 which extends to switch 112.

The notch or groove, for fiber 133, defined by the upper surfaces of the wires is a further means of preventing fiber 133 from starting to roll in response to the described motion of the scoring blade. A similar groove or notch may be provided in the upper surface of table 34, of the first embodiment, to insure against any such rolling.

SUMMARY OF METHODS AND OPERATION

From the standpoint of a person who uses the tool in the field or in a factory, there is no more difficulty of operation than exists relative to a typical hand tool such as a pair of pliers, a wrench, etc. All the operator need do is (1) mount the connector component (plug) 13' on plug receiver 23 (FIG. 6) by threading the connector ring until it fully seats, and then (2) squeeze and release the handles 11 and 12. The fiber is perfectly broken, on almost all occasions, so the operator removes the connector component 13' and then makes a connection to another connector component in the optical system as described in the cited patent applications and at the end of this specification.

Furthermore, it is not even necessary for the operator to take precautions to prevent breakage or damage to, or contamination of, the protruding end of the fiber. This is because release of connector component 13' from threaded portion 24 of plug receiver 23 operates to draw the broken-off end into plug or shell element 48' where it is fully protected. This drawing-back operation is effected by expansion of the compressed spring 31, and by associated components in the connector. It is emphasized that the fiber 133 is tightly held (clamped) by connector element 13'.

If the glass fiber is one which has a coating which does not automatically strip back in response to breaking, then the above-indicated electrical embodiment of the tool (FIGS. 12-14) is employed and the operator takes a few seconds longer in making the break. In other words, and as above stated, he holds the handle 12 almost closed toward handle 11 for a time period sufficient for the parallel wires 117, 118 to burn off the plastic coating, then he quickly releases handle 12 to complete the operation.

Although the apparatus and method are so simple and easy to perform in the field, they involve great precision, accuracy, repeatability, etc. For example, the setting of blade 76 is effected by means of a microscope in order to create the optimum scoring action as described relative to FIGS. 8 and 9. Furthermore, the setting of screw 101 to determine the extent of protrusion of the broken-off fiber end is done with great accuracy.

To summarize briefly the operation of the tool, the first small increment of movement of handle 12 toward handle 11 causes operation of a first cam means (elements 48, 51 and 52) to compress spring 46 to the correct extent for achievement of predetermined clamping pressure between friction elements 40, and also to generate a torque which urges tension table 36 away from the fiber support table 34 for achievement of a large part of the fiber-tensioning force. However, tensioning force is not generated in fiber 133 until there is an additional amount of movement of handle 12 toward handle 11, which additional movement operates through a second cam means, including a lost-motion connection, to release the tensioning table for pivoting in response to the bias of spring 46 and also the precisely determined bias of spring 67 (FIG. 2). This second cam means is cam surfaces 57-59 and the associated roller 61, whereas the lost-motion connection is between the upper and lower walls of opening 64 (FIG. 4) and the small end 65 of element 66. The relationships are such that the excessive squeezing of the handles by the operator will not affect the tension in any way.

Additional pivoting of handle 12 toward handle 11, and then away therefrom, operates the linkage 69 and the scoring blade 76 to make a precise score of fiber 133 and thus complete the break, the fiber having previously been clamped, tensioned and bent as described in detail. The mechanism for achieving this scoring includes a third cam means (elements 92, 94, etc.) and a parallelogram linkage 69 cooperating to create precision action and a scoring operation which is, again, independent of handle movement particularly in the lateral direction which would affect the spacing of the blade edge from the forward end of plug or shell element 48' (FIG. 6).

As described in detail above, the third cam means operates to cock itself during counterclockwise movement of handle 12, and effect the actual operation of linkage 69 for achievement of scoring during the reverse (clockwise) movement of handle 12 after the operator releases it. Also, during this reverse movement of handle 12, in the clockwise direction, the second cam means operates to pivot the tension table inwardly toward the fiber support table in that element 62 is pivoted downwardly by the end 65 of element 66, thus forcing roller 61 downwardly to the position adjacent cam surface 57. Thus, and also due to the operation of various springs, all parts return quickly to their original positions (shown in FIG. 1) when the handle is released.

FURTHER DESCRIPTION OF THE PREFERRED OPTICAL CONNECTOR

There will now be substantially repeated a portion of the specification of the above-cited patent application Ser. No. 874,558 for a Connector for Optical Fibers, inventors John S. Doty, Marc W. Malsby and Jayantilal N. Patel, which optical connector is combined with the present breaking tool. This will be done with reference to FIGS. 15, 16, 17, 18, 19 and 20 which correspond, respectively, to FIGS. 2, 4, 5, 6, 7 and 9 of said application Ser. No. 874,558. Primes are often employed in the reference characters in order to prevent confusion with the reference characters employed in previous portions of this specification.

The connector 10' (FIG. 15) includes a central receptacle to the opposite ends of which are connected identical plug assemblies one of which is shown in full at 13'. The other plug assembly is only shown in part, at the left of FIG. 15. These components connect optical fibers 133 and 136 to transmit light from one to the other.

The central receptacle incudes a tubular shell 17', having a central flange 18', provided with openings 19' for mounting to a suitable support.

Within the shell 17', as seen in FIG. 15, is a lens 21' of a suitable transparent material, such as plastic or glass, to provide a connecting system for the optical fibers of the type disclosed in the aforementioned patent application Ser. No. 767,692. The interior of the shell 17' includes a frustoconical surface 22' at a shallow taper that circumscribes the right-hand portion of the lens 21', as the connector is shown in FIG. 15. The surface 22' terminates in a radially inwardly extending shoulder 23'. The end 24' of the lens 21' is adjacent the shoulder 23' so that the shoulder 23' retains the lens against movement out of the receptacle shell toward the right-hand end.

The tapered surface 22' extends to the center of the shell 17' where it joins a cylindrical surface 26' within which is an annular recess 27'. A split lock ring 28' fits in the recess 27' adjacent the left-hand end 29' of the lens 21'. This retains the lens against movement out of the receptacle toward the left.

The lens 21' includes a frustoconical inwardly tapering surface 31' at its end 24' and a similar surface 32' at its end 29'. At the inner end of the surface 31' is a short cylindrical section 33' which terminates at a radial face 34'. The other end of the lens is symmetrical with a short cylindrical section 36' and a radial inner face 37'. Cavities 38' and 39' are located at the axis of the lens 21', extending inwardly from the surfaces 34' and 37', respectively. These cavities include frustoconical entrance portions terminating at inner end portions which are spherical segments. The inner ends of the cavities 38' and 39' are spaced apart, as illustrated. An optical fluid of predetermined index of refraction is located in the cavities 38' and 39'.

In the outer surface of the lens 21', extending from the end 24' to a position adjacent the end 29', is a longitudinal extending keyway 45'. This receives a pin 46' which extends radially through the wall of the shell 17', thereby rotationally positioning the lens 21' relative to the shell 17'.

As above stated, only the plug assembly 13' is shown in complete detail in FIG. 15, in view of the fact that the two plug assemblies are identical. The plug assembly 13' includes a front shell (sometimes hereinabove also called a plug) 48' and a rear shell 49', both of which are tubular. The forward section of the rear shell 49' fits around the rearward portion of the front shell 48' in a telescoping relationship. As a result, the rear shell is movable axially relative to the front shell and is guided by the interengagement of the two shells. The forward inner surface 50' of the rear shell 49' is cylindrical and provided with an annular recess 51', which receives a split lock ring 52'. This lock ring projects inwardly to interfere with a shoulder 53' on the exterior of the rearward portion of the front shell 48', which prevents the rear shell 49' from sliding off the front shell 48' when the plug is not mated with the receptacle, as in FIG. 20.

A compression spring 54' circumscribes the intermediate portion 55' of the front shell 48', with one end of the spring engaging a rearwardly facing external radial shoulder 56' on the front shell. The opposite end of the spring 54' bears against a radial surface 57' just inwardly of the forward end 58' of the rear shell 49'. This biases the rear shell 49' rearwardly relative to the front shell 48' so that when the plug assembly 13' is disconnected from the receptacle 11', the lock ring 52' is caused to bear against the shoulder 53' of the front shell 48'.

The inner surface 50' of the rear shell 49' is provided with a longitudinally extending keyway 60' which receives a key 61' projecting outwardly from the outer circumferential surface 62' of the front shell 48'. The keyway 60' and key 61' prevent relative rotation of the front shell 48' and the rear shell 49'.

The outer circumferential surface 63' at the rearward end of the front shell 48' is of reduced diameter, thereby providing a rearwardly facing shoulder 64' spaced inwardly of the rearward end surface 65' of the front shell. The rear shell 49' has an inner circumferential surface 66' which fits around the surface 63' when the connector is mated, terminating at its forward end in a radial shoulder 67'. An O-ring 68' circumscribes the front shell 48' at the surface 63' and, when the plug assembly 13' is attached to the receptacle, is compressed between the shoulders 64' and 67', forming a seal.

Forwardly of the shoulder 56', the external surface 69' of the front shell 48' is dimensioned to fit closely within the end of the receptacle shell 17' at the internal surface 70' of the latter member. A key 71' projects outwardly from the surface 69' of the front shell 48' and fits within a keyway 72', extending longitudinally of the surface 70' of the receptacle shell 17', thereby indexing the plug and preventing relative rotation between the plug 13' and receptacle 11'.

Forwardly of the circumferential surface 69', the front shell 48' has a relatively short surface 74' of slightly reduced diameter which, when the plug and receptacle are assembled, is engaged by an O-ring 75' to provide a seal. The O-ring 75' is received in an annular recess 76' in the receptacle shell 17'.

Beyond the surface 74' the front shell 48' includes a frustoconical surface 77', which is tapered at the same angle as the surface 31' of the lens 21'. In the assembled condition, the surface 77' of the front shell 48' engages the lens surfaces 31'.

Interiorly the front shell 48' includes a cylindrical surface 79', which extends forwardly from the rearward end 65' beyond the mid-portion of the front shell. At the inner end of the surface 79' is a forwardly tapering frustoconical surface 80', terminating at a cylindrical opening 81', having a relatively small diameter.

An insert 82' fits within the cylindrical opening 79' of the front shell 48' and is bonded in position. This insert is solid except for a narrow slot 83', seen in FIG. 18, which extends radially more than half way through the insert 82' and is the full length of the insert. The slot 83' is aligned rotationally with the key 71'.

Circumscribing the front shell 48' is a coupling ring 85', having a knurl 86' on its exterior surface for manual rotation. The forward end 86' of the coupling ring 85' is internally threaded to mate with external threads on the right-hand end portion of the receptacle shell 17'. At the rearward end of the coupling ring 85' is a radially inwardly extending flange 87' that fits behind a rearwardly facing shoulder 88' on the rear shell 49'. Behind the flange 87' of the coupling ring 85' is a split lock ring 89' that fits within an annular recess 90' in the external surface of the rear shell 49'. The lock ring 89' and the shoulder 88' prevent the coupling ring 85' from escaping from its position around the plug.

At the rearward end portion of the rear shell 49' is a radial wall 92', having a relatively small central opening 93'. When the plug and receptacle are assembled, as illustrated in FIG. 15, the wall 92' engages the rearward end 65' of the front shell 48'.

Rearwardly of the wall 92' the interior of the rear shell 49' includes a relatively large diameter portion 94', beyond which is a cylindrical surface 95' of smaller diameter. Adjacent the rearward end, the interior of the rear shell 49' includes an outwardly tapering frustoconical surface 96'. A key 97' extends inwardly of the frustoconical surface 96', with its inner edge forming an extension of the cylindrical surface 95'.

A fiber clamp 99' is located at the rearward end of the plug assembly and is circumscribed by a back shell nut 100'. The clamp 99', as shown in FIG. 15, includes two flat rectangular pads 102' and 103' of elastomeric material. These fit within complementary recesses 104' and 105', respectively, in rigid pressure members 106' and 107'. The latter members are of half-round configuration and include flat radial surfaces along their sides which are their mating faces.

Forwardly of the recesses 104' and 105', the members 106' and 107' include narrow, deep semicylindrical recesses 110' and 111', which together receive a washer 112' that prevents relative longitudinal movement of the members 106' and 107'.

Forwardly of the recesses 110' and 111' the members 106' and 107' include semicylindrical inner surfaces 113' and 114' connecting to frustoconical surfaces 115' and 116' that diverge to the forward end.

Exteriorly the members 106' and 107' include outwardly projecting flanges 117' and 118' that fit within the recess defined by the surface 94' of the rear shell 49', preventing escape of the clamp from the plug. Inwardly of the flange 118' of the member 106' is an exterior cylindrical surface 119' connected to a rearwardly flaring surface 120' that is a segment of a cone. Similarly, the member 107' has a semicylindrical surface 121' and a tapered surface 122' which is a segment of a cone. Rearwardly of the surfaces 120' and 122', the members 106' and 107' have semicylindrical surfaces 123' and 124', beyond which are tapered surfaces 125' and 126' which are conical sections and converge toward the rear. A keyway 127' extends axially of the member 106' at the surfaces 120', 123', and 125'. A similar keyway may be formed in the member 106' to economize manufacture by making the parts 106' and 107' identical.

The back shell nut 100' includes internal threads at its forward end which are adapted to mate with external threads on the rearward end of the rear shell 49'. The intermediate interior portion of the back shell nut 100' defines a rearwardly convergent tapered surface 128' which is frustoconical and at the same angle as the surfaces 125' and 126' of the clamp members 106' and 107'. At the rearward end, the back shell nut has a radial wall 129', through which is an opening 130'. The exterior of the back shell nut 100' has a knurl 131' to enable the nut to be rotated by hand.

The optical fiber 133, which extends into the plug assembly 13', has a protective sheath 132. Sheath 132 fits snugly within the opening 130' in the back shell nut and extends to the rearward end of the clamping members 106' and 107'. However, the sheath is stripped from the fiber 133 within the plug so that the fiber extends through the clamp and into the front shell 48'. The fiber 133 fits closely within the opening 93' in the wall 92' of the rear shell 49' as it enters the plug, where it passes through the slot 83' of the insert 82'. The forward end of the fiber extends through the opening 81' in the front shell, where it is closely received, to enter the lens cavity 38'.

Prior to attaching the plug 13' to the receptacle 11', the optical fiber 133 is extended into the plug and the two sections of the fiber clamp 99' are positioned one on either side of the fiber. The forward adjacent surfaces 134' and 135' of the clamp members 106' and 107' flare forwardly and radially outwardly. This enables the forward portion of the fiber clamp to be compressed, reducing its radial dimension at the flanges 117' and 118'. In this way the flanges 117' and 118' can be moved through the end of the rear shell 49' at the circumferential surface 95' to enter the recess at the circumferential surface 94' of larger diameter. The flanges 117' and 118' are narrower at their side portions, adjacent the surfaces 134' and 135', so that there is ample clearance at those locations to pass through the opening defined by the surface 95'.

Next, the back shell nut 100' is tightened onto the rearward end of the rear shell 49'. This causes the tapered surface 128' of the back shell nut to bear against the tapered surfaces 125' and 126' of the clamping members 106' and 107', urging these members forwardly and inwardly. The forward tapered surfaces 120' and 122' of the clamping members 106' and 107' thereby are pressed against the tapered surface 96' at the rearward end of the rear shell 49'. The reactions of the tapered surfaces cause the clamping members 106' and 107' to be pressed radially toward each other to bring their mating surfaces into firm engagement. This in turn causes the resilient pads 102' and 103' to bear against and grip the fiber 133, but without damaging the fiber because the clamping force is limited by the engagement of the surfaces which terminate the inward movement of the members 105' and 106'. Also, the key 97', fitting in the keyway 127', prevents rotation of the fiber clamp 99' as the fiber is gripped.

With the optical fiber thus held in the plug assembly 13', it is then attached to the receptacle by threading the coupling ring 85' onto the external threads of the receptacle shell 17'. As this occurs, the coupling ring, through the flange 87', presses forwardly on the rear shell 49' at the shoulder 88', sliding the rear shell forwardly over the front shell 48' until the wall 92' of the rear shell 49' engages the end 65' of the front shell 48'.

The forward movement of the rear shell, reacting through the shoulder 57', causes the spring 54' to press against the shoulder 56' of the front shell 48' to bias the front shell forwardly. The forward frustoconical surface 77' of the front shell 48' engages the frustoconical surface 31' of the lens 21', however, so that the front shell does not move forwardly, but is pressed against the lens surface 31' by the resilient force of the spring.

As the rear shell 49' is moved forwardly relative to the front shell 48', and hence relative to the lens 21', the fiber 133 also is moved forwardly. This occurs because the fiber 133 is gripped at the clamp 99' which, through the back shell nut 100', is connected to the rear shell 49'. This moves the end of the fiber 133 into the lens cavity 38' to engage the tapered cavity surface. This positions the end of the fiber adjacent the inner cavity surface and aligns the fiber axis with the optical axis of the lens, as set forth in the aforementioned patent application for Optical Fiber Connector. The optical fluid within the cavity 38' is displaced by the fiber 133 so that it occupies the space between the fiber end and the inner cavity surface, with some additional fluid around the periphery of the fiber. An excess of the fluid is provided to be sure that the cavity is entirely filled beyond the fiber end.

The fiber 133, forwardly of the clamp 99', is longer than the distance between the clamp and the inner end of the lens cavity 38', which causes the fiber to bow within the front shell 48' at the location of the tapered surface 80' and within the slot 83' of the insert 82'. The width of the slot 83' is close to the diameter of the fiber 133 so that the direction of the bow in the fiber is closely controlled by the direction of the slot 83'.

The second plug assembly is identical to the plug assembly 13' so that it connects to the receptacle in the same manner as does the assembly 13'. Connection of the plug assembly 13' to the receptacle causes the light-conductive fiber 136 of the second plug assembly to enter the cavity 39' and bear against the tapered surface thereof. This aligns the fiber 138 with the axis of the cavity 39' and thus with the axis of the fiber 133 so that light can be transmitted between these two fibers. Optical fluid in the cavity 39' fills the space between the end of the fiber 136 and the cavity surface after the fiber enters the cavity.

The components of the second plug assembly are given the same reference numbers as the corresponding components of the plug assembly 13', but with the suffix "a."

When the second plug assembly is connected to the central receptacle, the frustoconical surface 77a' of its front shell 48a' is caused to bear against the tapered lens surface 32' in a manner similar to that occurring on the opposite side of the lens. The lens 21' has a smaller external dimension than the dimensions of the space within the receptacle shell which it occupies, so that it can float a limited distance within the receptacle shell. The outer surface 137' of the lens tapers slightly toward either end to facilitate angular as well as rectilinear floating movement. This enables the lens 21' to be aligned precisely with the plug assemblies by the interengagement of the tapered surfaces of the front plug shells with the tapered lens surfaces. This direct centering of the plugs with the lens helps to accurately align the fibers 133 and 136 with the lens cavities 38' and 39'.

Figure 20:
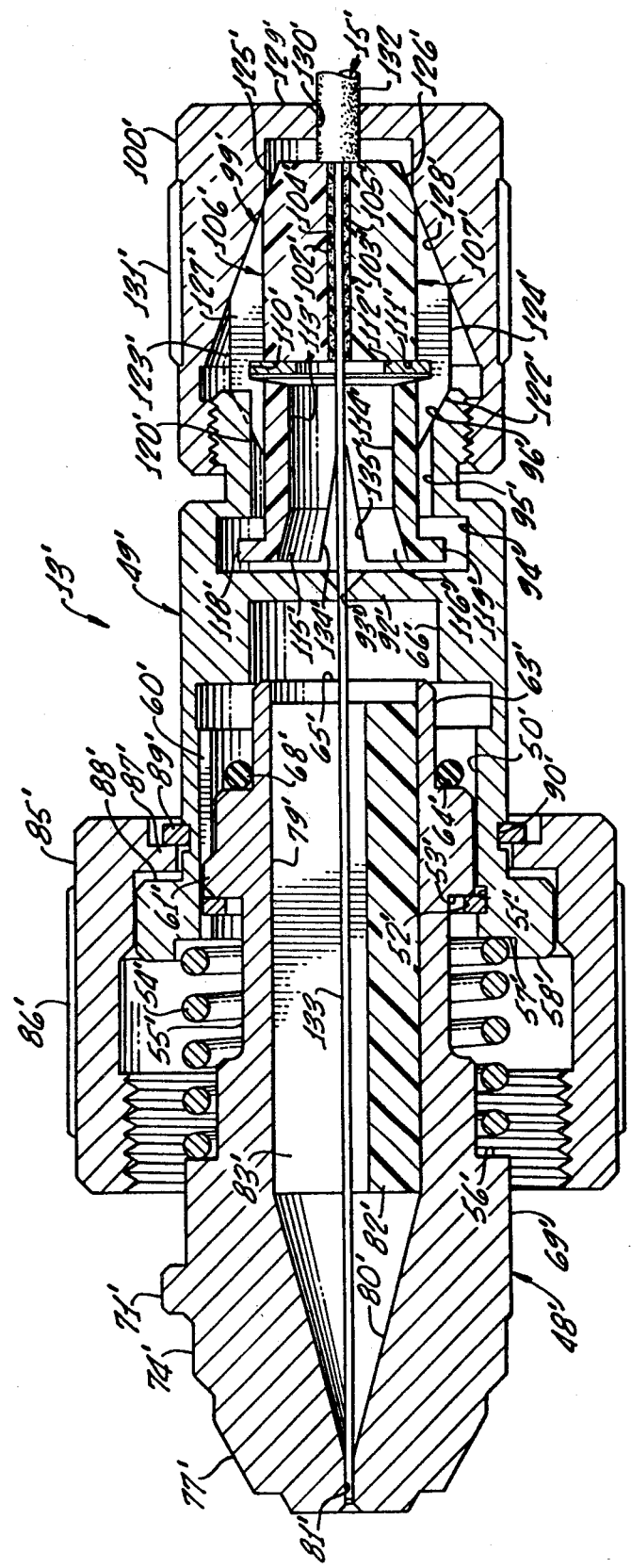
FIG. 20 is a longitudinal sectional view showing one of the plugs separated from the receptacle of the optical connector.

The spring of the plug that biases the front shell against the tapered lens surface when the connector is mated also moves the rear shell rearwardly when the plug is disconnected. For the plug 13', as shown in FIG. 20, the spring 54' shifts the rear shell 49' rearwardly relative to the front plug 48' until the lock ring 52' is stopped by engagement with the shoulder 53' of the front shell 48'. This movement of the rear shell 49' causes the fiber clamp 99' to move the fiber 133 also to the rear relative to the front shell. As a result, the forward end of the fiber 133 is retracted back into the opening 81' in the front shell 48'. Therefore, the fiber 133 does not project outwardly where it can be damaged when the plug is disconnected, instead being inside the plug and fully protected. This is especially advantageous for an optical fiber connector suitable for field use, in view of the extreme vulnerability of optical fibers to damage. Of course, the length of the fiber 133 forwardly of the clamp 99' must be correlated with the travel of the rear shell 49' to assure full retraction when disconnected and enough extension when mated to force the fiber into the lens cavity as described above.

As previously described, the two plug assemblies are sequentially engaged with the fiber breaker, and such breaker is operated to form perfect mirror ends on the fiber 133 of first plug assembly 13' and fiber 136 of the second plug assembly. Such mirror ends, in combination with the accurate axial alignment achieved by the present connector, create an optimum optical coupling.

In the appended claims, the words "clean break" and "perfect break" are sometimes used as shorthand ways of describing a break wherein the end faces are perpendicular to the fiber axes and are mirror smooth.

The width of the scoring edge is, very preferably, less than 0.001 inch.

The foregoing detailed description is to be clearly understood as given by way of illustration and example only, the spirit and scope of this invention being limited solely by the appended claims.

I claim:
1. A breaker for optical fibers, which comprises:
 (a) means to clamp one portion of an optical fiber having a cylindrical shape,
 (b) means to clamp a second portion of said fiber at a location spaced from said one portion,
 (c) means to bend to a predetermined degree of curvature the region of said fiber between said clamped portions thereof,
   said degree of curvature being such that said fiber will, when scored transversely and while under a predetermined tension, break cleanly to provide mirror-like ends at the break,

(d) means to create said predetermined tension in said fiber region, and (e) means to effect said transverse scoring of said fiber, said scoring means comprising a blade edge and means to move said edge along a curved path which (1) lies in a plane substantially perpendicular to the axis of said fiber at the region of scoring, and (2) intersects the curved surface of said fiber in said plane, the direction of curvature of said path being opposite to the direction of curvature of the intersected fiber surface region in said plane, the degree of intersection of said path with said surface region being adapted to effect said clean break of said fiber.

2. The invention as claimed in claim 1, in which said means (a) comprises an optical connector element removably secured to the breaker.

3. The invention as claimed in claim 2, in which said connector element is removably mounted at a precise location on the breaker.

4. A method of quickly and cleanly breaking a cylindrical optical fiber so as to achieve mirror-like ends which lie in planes substantially perpendicular to the axes of the broken fiber sections, said method comprising:

(a) bending an optical fiber about a curved support means which has a predetermined curvature radius, (b) applying a predetermined tension to the bent fiber, said predetermined radius and said predetermined tension being adapted to effect said clean break of said fiber when it is scored, and (c) scoring said fiber by initially moving the edge of a scoring blade along a path which is not parallel to or coincident with the longitudinal diametral plane of said bent fiber, the initial engagement of said blade edge with said bent fiber being instead effected by moving said blade along a path which is (1) generally at a large acute angle to the part of said longitudinal diametral plane which is above said fiber, and (2) is such that said bent fiber is first engaged at a region remote from said support means.

5. The invention as claimed in claim 4, in which said scoring is effected by moving said edge along a curved path.

6. The invention as claimed in claim 4, in which said method further comprises moving said edge of said scoring blade along a curved path which is both downward and lateral relative to the fiber.

7. The invention as claimed in claim 6, in which said blade is hard mounted and is not adapted to create any predetermined maximum scoring pressure.

8. Apparatus for quickly and cleanly breaking an optical fiber so as to achieve mirror-like ends which lie in planes substantially perpendicular to the axes of the broken fiber sections, said apparatus comprising:

(a) a fiber support means having a predetermined curvature radius, (b) means to clamp an optical fiber with sufficient force and friction to prevent slipping of the fiber in the clamp means when said fiber is under a predetermined tension, said predetermined radius and tension being such as to effect a clean break when said fiber is scored, (c) manually-operable means to move said clamp means to achieve said predetermined tension, said means being a spring means, said spring means comprising two springs, one of said springs being adapted to achieve both proper clamping pressure relative to the optical fiber and also to achieve a portion of the requisite tensioning force, the second of said springs being adjustable to achieve the remainder of the tensioning force whereby said springs combine to create said predetermined tension in said fiber, (d) means to prevent said manually-operable means from being operated in such manner that said predetermined tension will be exceeded, and (e) means to score said fiber.

9. A method of making an optical fiber connection, which comprises:

(a) mounting fixedly on a single optical fiber one component of a fiber connector, the mounting being such that there is a protruding fiber end of random length, (b) removably mounting said connector component on a fiber dividing tool at a predetermined known position and at a location such that said protruding fiber end is located to be divided by said tool, (c) correlating said fiber dividing tool with said predetermined position of said connector component in such manner that when the fiber is divided the end protruding from said connector component will no longer be of random length but instead will have a precise length such as to achieve an optimum fiber connection when said connector component is demounted from said tool and is mated with another connector component located remote from said dividing tool, (d) effecting said dividing of said fiber by said dividing tool, (e) retracting the broken-off portion into said component of said fiber connector in response to the disengaging of said connector component from said dividing tool, so that there is no danger of injury to or contamination of the broken-off end during transport to the other connector component, and (f) demounting said connector component from said dividing tool and engaging said connector component with said other connector component, thus achieving said optimum connection.

10. The invention as claimed in claim 9, in which said method further comprises causing protrusion of the broken-off end into the other connector component when the connection is made as recited in step (e).

11. A tool for quickly and cleanly breaking optical fibers so as to achieve mirror-like ends which lie in planes substantially perpendicular to the axes of the broken fiber sections, said tool comprising:

(a) a fiber support having a predetermined curvature radius, (b) means to clamp an optical fiber with sufficient force and friction to prevent slipping of the fiber in the clamp means when said fiber is under a predetermined tension, said predetermined radius and tension being such as to effect a clean break when said fiber is scored after being tensioned about said fiber support so as to have said predetermined curvature radius, (c) means to move said clamp means to achieve said predetermined tension, said means including at least one spring adapted to apply only a predetermined limited tension to said clamped fiber, said means further including cam means to prevent said spring from thus tensioning said fiber until said cam means is in a predetermined position, (d) means to move said cam means to said predetermined position, and (e) means to score said clamped, bent and tensioned fiber to achieve the desired break.

12. A hand-held optical fiber breaker, comprising:
(a) first and second handle means,
(b) means responsive to an initial increment of movement of said handle means relative to each other, to effect clamping of an optical fiber at a single location,
(c) means responsive to an additional increment of movement of said handle means to effect predetermined, correct tensioning of said fiber and also bending thereof to a predetermined extent,
said fiber tensioning means including a cam means, there being a lost-motion connection between said cam means and said handle means, said tensioning and bending being such as to result in a clean break in the fiber when it is scored, and
(d) means responsive to an additional increment of movement of said handle means to effect scoring of said clamped, tensioned and bent fiber to thus cause said clean break having the requisite optical characteristics.

13. A hand-held optical fiber breaker, comprising:
(a) first and second handle means,
(b) means responsive to an initial increment of movement of said handle means relative to each other, to effect clamping of an optical fiber at a single location,
(c) means responsive to an additional increment of movement of said handle means to effect predetermined, correct tensioning of said fiber and also bending thereof to a predetermined extent,
said fiber tensioning means including a cam means, said cam means being adapted to release a spring-biased tensioning table for tensioning movement only after completion of proper clamping of the fiber, said tensioning and bending being such as to result in a clean break in the fiber when it is scored, and
(d) means responsive to an additional increment of movement of said handle means to effect scoring of said clamped, tensioned and bent fiber to thus cause said clean break having the requisite optical characteristics.

14. A method of making a perfect break in an optical fiber in a single operation, and without reference to excessive scorer pressure, which method comprises:
(a) bending an optical fiber about a support which is gradually curved in a manner adapted to result in a perfect break,
(b) effecting tensioning of said fiber in a tension range adapted to result in said perfect break, and
(c) initially contacting with said bent, tensioned fiber, and in a scoring direction, the sharp edge of a scoring blade which is formed of a cemented carbide sufficiently rough to effect scoring substantially immediately and sufficiently smooth to permit creation of said sharp edge,
said initial contact being effected by moving a hard-mounted support for said blade, which support is immune to the effects of gravity and is not adapted to limit the maximum pressure exerted by said blade.

15. The invention as claimed in claim 14, in which said blade is cemented tungsten carbide the particle size of which is, generally, in the range of about one micron to about two microns.

16. The invention as claimed in claim 15, in which said particle size is typically about 1.25 microns.

17. The invention as claimed in claim 15, in which said carbide is about 94 percent tungsten carbide and about 6 percent cobalt, and has a hardness of about 92 on the Rockwell A scale.

18. The invention as claimed in claim 15, in which the width of said sharp edge is about 0.0005 inch.

19. A method of preparing and then connecting two optical fibers to achieve an optical connection therebetween, the fibers then being in substantial axial alignment with each other, said method comprising:
(a) mounting one optical fiber in clamped relationship in one element of an optical connector,
(b) mounting said one element on a fiber breaking tool in a predetermined position,
(c) employing said tool to curve said fiber about a predetermined radius, tension said fiber to a tension in a predetermined range, and score said fiber in a predetermined location to thus achieve a break,
(d) demounting said one element from said fiber breaking tool,
(e) mounting a second optical fiber in clamped relationship in a second element of said optical connector,
(f) mounting said second element on said fiber breaking tool in a predetermined position,
(g) employing said tool to curve said second fiber about a predetermined radius, tension said second fiber to a tension in a predetermined range, and score said second fiber in a predetermined location to thus achieve a break,
(h) demounting said second element from said tool,
(i) connecting said one element and said second element of said optical connector to each other in a predetermined relationship causing a low-loss optical connection to be achieved between the thus-broken ends of said optical fibers,
said one element and said second element of said connector being identical to each other, and
(j) mounting said elements at predetermined positions on opposite sides of a third element of said connector, and with said thus-broken fiber ends extending into said third element,
said predetermined positions of clauses (b) and (f) being coincident.

20. A fiber breaker, which comprises:
(a) means to define a groove adapted to seat an optical fiber therein in fixed relationship.
said groove curving longitudinally to form an arc which said fiber follows when seated in said groove, the arc being such that when the fiber is tensioned within a predetermined tension range and is scored, it will break perpendicularly and form mirror ends,
(b) means to tension said fiber to a tension within said range, and
(c) means to score said tensioned fiber by moving the edge of a scoring blade laterally thereacross,
said fiber being prevented, by the sides of said groove, from rolling in response to said scoring movement, said means (c) effecting movement of said blade both downwardly and laterally at the instant of initial contact with said fiber.

21. The invention as claimed in claim 20, in which at least one wall of said groove is formed by a resistive wire, and in which means are provided to pass heater current through said wire to heat said fiber and thus burn a synthetic resin coating therefrom.

22. The invention as claimed in claim 20, in which said tool effects said tensioning of said fiber prior to scoring thereof whereby said groove and the tension cooperate to prevent fiber rolling.

23. A hand-held breaker for optical fibers, comprising:
   (a) support means,
   (b) handle means associated with said support means,
   (c) means responsive to a first increment of movement of said handle means to clamp an optical fiber,
   (d) means responsive to additional increments of movement of said handle means to tension said fiber and bend the same about a predetermined radius,
   (e) means responsive to a further movement of said handle means to heat said clamped, tensioned and bent optical fiber in a region where scoring is to occur,
      said heating effecting burning-off of a synthetic resin coating on said fiber in said region, and
   (f) means responsive to yet another increment of movement of said handle means to score said coating-free region of said fiber to thus achieve clean, broken ends the end faces of which are mirror smooth and perpendicular to the fiber axes.

24. The invention as claimed in claim 23, in which said increments of movement recited in (c), (d) and (e) are all in one direction, and in which said increment of movement recited in (f) is in a direction opposite to such one direction.

25. A breaker for optical fibers, which comprises:
   (a) means to clamp, bend and tension an optical fiber, said means being such that said fiber will break perpendicularly at a point where it is scored, and
   (b) means to score said fiber at a predetermined desired scoring point,
      said means comprising a parallelogram linkage having a scoring blade mounted thereon, said means further comprising means to shift said linkage to cause the edge of said blade to follow a curved path which is precisely located.

26. The invention as claimed in claim 25, in which said blade is mounted on an arm, said arm being adjustably secured to a portion of said linkage.

27. The invention as claimed in claim 25, in which said parallelogram linkage is mounted on a body portion of the fiber breaking tool, in which there is mounted on said body portion a movable element adapted to removably receive a fiber-clamping element of an optical fiber connector, and in which means are provided to adjust said movable element relative to said body portion, said adjustment means and said parallelogram linkage cooperating to insure that the point of scoring, relative to said fiber-clamping element, may be accurately controlled and will remain the same even after sequential scoring of large numbers of fibers.

28. The invention as claimed in claim 25, in which said breaker incorporates handle means adapted to be shifted to operate said scoring means, in which means are provided to bias said linkage to a predetermined position at which said blade is remote from said fiber, and in which means responsive to movement of said handle means are provided to shift said linkage from said predetermined position to a fiber-scoring position.

29. In a hand-held breaker for optical fibers:
   (a) a support element,
   (b) scoring means movably mounted on said support element,
   (c) first and second handle means mounted on said support element,
      at least said first handle means being movable relative to said support element, and
   (d) means to associate said first handle means with said scoring means in such manner that said scoring means does not move during shifting of said first handle means toward said second handle means to a position relatively adjacent said second handle means, but does move to a fiber-scoring position in response to shifting of said first handle means from said relatively-adjacent position to a position relatively remote from said second handle means.

30. The invention as claimed in claim 29, in which means are provided to bias said scoring means to a predetermined position away from said fiber-scoring position, and in which said means (d) comprises cam means movably mounted on said support element, and in which further cam means are mounted on said first handle means, said further cam means connecting to said first-mentioned cam means when said first handle means moves toward said second handle means, said first-mentioned cam means and further cam means cooperating to shift said scoring means when said first handle means then moves away from said second handle means, said first-mentioned cam means then disengaging from said further cam means in response to additional movement of said first handle means away from said second handle means.

31. The invention as claimed in claim 29, in which said scoring means is pivotally mounted on said support element whereby said scoring means follows a curved path, said curved path being generally lateral to the fiber whereby scoring occurs at the instant of initial contact of the blade with the fiber.

32. A hand-held breaker for optical fibers, comprising:
   (a) handle means,
   (b) movably-mounted tension table means,
   (c) a clamp element movably mounted relative to said tension table means,
   (d) means to connect said handle means to said clamp element to shift the latter to a clamping position, at which an optical fiber is clamped between said clamp element and said tension table means, in response to movement of said handle means,
      said means (d) being a cam means which effects a predetermined amount of movement of said clamp element in response to a certain amount of shifting of said handle means, but does not cause substantial additional movement of said clamp element in response to additional shifting of said handle means, and
   (e) spring means cooperating with said means (d) to create a predetermined fiber clamping force on said fiber.

33. The invention as claimed in claim 32, in which said spring means is a preloaded compression spring interposed between said cam means and said clamp element.

34. The invention as claimed in claim 32, in which said means (d) further acts to urge said tension table means in a fiber-tensioning direction.

35. A fiber-breaking tool for optical fibers, comprising:
    (a) support means,
    (b) a tension table movably mounted on said support means,
    (c) means to clamp a fiber on said tension table,
    (d) means to bias said table in a predetermined direction which effects tensioning of the fiber,
    (e) means to hold said table in a predetermined position, despite said bias exerted by said means (d), and
    (f) means responsive to movement of an actuating element to shift said means (e) to a table-releasing position whereby to permit said bias means to effect predetermined tensioning of the fiber.

36. The invention as claimed in claim 35, in which said means (f) is a cam element which cooperates with cam surface means on said tension table.

37. A breaker for optical fibers, comprising:
    (a) a body,
    (b) a fiber-scoring assembly movably mounted on said body,
        said assembly including a scoring edge movable generally in a predetermined plane,
    (c) a plug-holder arm pivotally mounted on said body for limited pivotal movement about an axis disposed generally in said plane,
    (d) a plug receiver mounted on said arm and adapted to mate with a plug portion of an optical connector,
    (e) means to pivotally adjust said arm to thus vary the location of said plug receiver relative to said scoring assembly, and
    (f) means to clamp, bend and tension a fiber end which extends outwardly from said plug portion, so that operation of said scoring assembly will make a perpendicular break at a predetermined point.

38. The invention as claimed in claim 37, in which means are provided to bias said fiber-scoring assembly so that the blade thereof is normally out of the way of a fiber being inserted through said plug receiver.

39. A breaker for optical fibers, comprising:
    (a) a body,
    (b) a fiber-scoring assembly movably mounted on said body for fiber-scoring movement in response to shifting of an actuating portion of the fiber breaker,
    (c) a tension table pivotally mounted on said body,
    (d) a clamp element disposed above said table,
    (e) a tension rod connected to said clamp and extended slidably through said table,
    (f) a compression spring mounted around said rod below said table,
    (g) means responsive to a predetermined movement of said actuating portion to act on said spring in such manner as to shift said clamp toward said table and thus clamp an optical fiber, and
    (h) means responsive to a predetermined additional movement of said actuating portion to effect pivoting of said table for tensioning of said clamped fiber to a tension within a predetermined range.

40. The invention as claimed in claim 39, in which said spring is preloaded to such an extent that a small additional compression thereof by said means (g) will apply the desired fiber-clamping pressure to the fiber.

41. The invention as claimed in claim 39, in which said rod is disposed substantially to one side of the pivot axis for said table, such that clamping of the fiber also tends to pivot said table in a fiber-tensioning direction.

42. The invention as claimed in claim 39, in which said means (h) comprises cam means to hold said table against pivoting despite the force resulting from said clamping, and further comprises means to shift said cam into a table-releasing position in response to said predetermined additional movement of said actuating portion.

43. The invention as claimed in claim 42, in which additional spring means are provided to bias said table in a fiber-tensioning direction, and with a predetermined force adapted to cooperate with the above-indicated pivotal force to achieve a tension in a predetermined range.

44. The invention as claimed in claim 39, in which a plug holder arm is pivoted on said body at the same pivot axis as that for said tension table, in which a fiber support table is mounted on said arm, and in which a receiver is mounted on said arm adjacent said table, said receiver being adapted to mate with a portion of an optical connector.

45. A hand-held breaker for optical fibers, which comprises:
    (a) a back plate,
    (b) first and second handles mounted on said back plate,
        said first handle being pivoted to said back plate for pivotal movement relative thereto,
    (c) a scoring assembly pivotally mounted on said back plate,
        said scoring assembly being a parallelogram linkage two arms of which are pivoted to said back plate and a third arm of which is generally horizontal,
        said scoring assembly further comprising a blade-holder arm mounted on said third arm of said parallelogram linkage in adjustable relationship relative thereto, there being a fiber-scoring blade at the end of said blade-holder arm,
        said blade having a scoring edge which is generally parallel to said third arm of said linkage,
        said linkage being provided with precision link connectors which cause said scoring edge to move in the same plane upon each shifting of said linkage,
        means to bias said linkage to such a predetermined position that said scoring edge is located at a certain point,
    (d) a plug holder arm pivotally mounted to said back plate at a location beneath said scoring edge,
        said plug holder arm including a plug receiver adapted to mate with an element of an optical connector in a predetermined relationship,
        said plug receiver being offset relative to the predetermined normal position of said blade edge whereby an optical fiber may be easily inserted through said plug receiver,
    (e) means to pivot said plug holder arm toward and away from said blade to thus determine the location of the scoring point relative to an optical fiber extended from the connector element through said plug receiver, (f) a fiber support table mounted on said plug holder arm beneath said plug receiver for support of said fiber, said support table being curved about a predetermined radius adapted to achieve a correct break in the optical fiber, (g) a tension table pivotally mounted to said back plate at the same pivot axis as that for said plug holder arm, (h) a clamp element disposed above said tension table, (i) a tension rod extended from said clamp element through said tension table to a position therebeneath, (j) a helical compression spring mounted about said rod beneath said tension table and being preloaded to a predetermined extent adapted to achieve correct clamping of said fiber between said tension table and said clamp element, (k) cam means associated with said tension table and normally adapted to maintain said table in a predetermined position, (l) bias means to shift said table in a fiber-tensioning direction when said cam means is shifted to a releasing position, (m) cam means associated with said first handle to move said helical compression spring downwardly and thus shift said clamp element toward said table and effect achievement of said correct clamping pressure in response to a predetermined initial movement of said first handle, (n) means on said first handle to shift said cam means (k) to a table releasing position in response to a predetermined additional movement of said handle, whereby said tension table then is pivoted to tension said fiber a predetermined amount, (o) means pivotally mounted on said back plate to effect shifting of said scoring assembly to such position that said blade scores said fiber, the direction of movement of said blade upon contacting said fiber being generally parallel to said scoring edge, and (p) means on said first handle to engage said shifting means (o) when said first handle is pivoting toward said second handle, but without shifting said scoring assembly at that time, said means being adapted to effect shifting of said scoring assembly to effect said scoring of said fiber when said first handle moves away from said second handle.

46. The invention as claimed in claim 45, in which there is a lost motion connection between said means (m) and said cam means (k).

47. The invention as claimed in claim 45, in which said blade moves in a plane which extends through the common pivot axis of said tension table and said plug holder arm.

48. The invention as claimed in claim 45, in which said blade holder arm is associated with said third arm by means of a spring, in which adjustment means are provided for said blade holder arm, and in which said spring has such force that it does not permit said blade to move relative to said third arm during scoring of the fiber.

49. The invention as claimed in claim 45, in which said blade is made of tungsten carbide.

50. The invention as claimed in claim 45, in which means responsive to shifting of said first handle to a position relatively adjacent said second handle are provided to effect heating of the fiber portion to be scored by said blade.

51. The invention as claimed in claim 45, in which said breaker is combined with an optical connector portion which mates with said plug receiver, said portion including:

(a) a threaded element which threads to said receiver, (b) clamp means for said fiber, and (c) spring means to retract the broken fiber end clear into the connector in response to unthreading relative to said plug receiver, the scoring blade and thus break point being sufficiently close to the connector that said complete retraction may occur.

52. The invention as claimed in claim 45, in which said cam means (m) includes an elongated element so shaped that excessive shifting of said first handle toward said second handle does not result in excessive fiber-clamping pressure.

53. The invention as claimed in claim 45, in which said bias means (l) includes said spring and further comprises an adjustable spring.

54. The combination with an optical connected which, during making of an optical connection, causes a predetermined amount of axial extension of an optical fiber relative to a certain portion of the connector, of a fiber breaker adapted to mate with said certain portion of said connector and to effect an equal amount of axial extension of said fiber, said breaker further comprising means to break said fiber at a location so close to said certain portion that, upon disconnection of said certain portion from the breaker, the broken end will automatically retract an equal amount and will be recessed into said certain portion for protection against contamination and breakage.

55. Apparatus for quickly and cleanly breaking an optical fiber so as to achieve mirror-like ends which lie in planes substantially perpendicular to the axes of the broken fiber sections, said apparatus comprising:

(a) a fiber support means having a predetermined curvature radius, (b) means to clamp an optical fiber with sufficient force and friction to prevent slipping of the fiber in the clamp means when said fiber is under a predetermined tension, said predetermined radius and tension being such as to effect a clean break when said fiber is scored, (c) manually-operable means to move said clamp means to achieve said predetermined tension, said means being a spring means, (d) means to prevent said manually-operable means from being operated in such manner that said predetermined tension will be exceeded, said means (d) comprising means to isolate said clamp means from the operator, in such manner that the only fiber-tensioning force acting on said clamp means is said spring means, and also in such manner that the force of said spring means is not affected by excess force exerted by the operator, and (e) means to score said fiber.

56. Apparatus for quickly and cleanly breaking an optical fiber so as to achieve mirror-like ends which lie in planes substantially perpendicular to the axes of the broken fiber sections, said apparatus comprising:

(a) a fiber support means having a predetermined curvature radius, (b) means to clamp an optical fiber with sufficient force and friction to prevent slipping of the fiber in the clamp means when said fiber is under a predetermined tension,
  said predetermined radius and tension being such as to effect a clean break when said fiber is scored,
(c) manually-operable means to move said clamp means to achieve said predetermined tension,
  said means being a spring means,
(d) means to prevent said manually-operable means from being operated in such manner that said predetermined tension will be exceeded,
  said means (d) comprising means to prevent said spring means from exerting fiber-tensioning force on said claim means until a predetermined movement is made by the operator, and further comprising means to prevent the force of said spring means on said clamp means from increasing substantially in response to an operator movement additional to said predetermined movement, and
(e) means to score said fiber.

57. A hand-held optical fiber breaker, comprising:
(a) first and second handle means,
(b) means responsive to an initial increment of movement of said handle means relative to each other, to effect clamping of an optical fiber at a single location,
(c) means responsive to an additional increment of movement of said handle means to effect predetermined, correct tensioning of said fiber and also bending thereof to a predetermined extent,
  said tensioning and bending being such as to result in a clean break in the fiber when it is scored, and
(d) means responsive to an additional increment of movement of said handle means to effect scoring of said clamped, tensioned and bent fiber to thus cause said clean break having the requisite optical characteristics,
  said scoring means including a cam means adapted to isolate a scoring blade from any improper or excessive actions of the operator on the handle means.

58. The invention as claimed in claim 57, in which said cam means is adapted to be engaged in response to closing of the handle means and is adapted to effect scoring of the fiber in response to at least partial opening of the handle means.

59. A hand-held optical fiber breaker, comprising:
(a) first and second handle means,
(b) means responsive to an initial increment of movement of said handle means relative to each other, to effect clamping of an optical fiber at a single location,
(c) means responsive to an additional increment of movement of said handle means to effect predetermined, correct tensioning of said fiber and also bending thereof to a predetermied extent, said tensioning and bending being such as to result in a clean break in the fiber when it is scored, and
(d) means responsive to an additional increment of movement of said handle means to effect scoring of said clamped, tensioned and bent fiber to thus cause said clean break having the requisite optical characteristics,
  said scoring means including a parallelogram linkage which causes a scoring blade to move along a predetermined path.

60. The invention as claimed in claim 59, in which said scoring blade is hard mounted, there being no necessity for limiting the maximum pressure of the blade.

61. A method of preparing and then connecting two optical fibers to achieve an optical connection therebetween, the fibers then being in substantial axial alignment with each other, said method comprising:
(a) mounting one optical fiber in clamped relationship in one element of an optical connector,
(b) mounting said one element on a fiber breaking tool in a predetermined position,
(c) employing said tool to curve said fiber about a predetermined radius, tension said fiber to a tension in a predetermined range, and score said fiber in a predetermined location to thus achieve a break,
(d) demounting said one element from said fiber breaking tool,
(e) mounting a second optical fiber in clamped relationship in a second element of said optical connector,
(f) mounting said second element on said fiber breaking tool in a predetermined position,
(g) employing said tool to curve said second fiber about a predetermined radius, tension said second fiber to a tension in a predetermined range, and score said second fiber in a predetermined location to thus achieve a break,
(h) demounting said second element from said tool,
(i) retracting each thus-broken end of said one fiber and second fiber into its associated optical connector element,
  whereby to minimize the possibility of damage or contamination of the broken end,
(j) connecting said one element and said second element of said optical connector to each other in a predetermined relationship causing a low-loss optical connection to be achieved between the thus-broken ends of said optical fibers, and
(k) re-extending each thus-broken end when said connector elements are connected to each other.

62. A breaker for optical fibers, comprising:
(a) means to removably mount, in a predetermined position, a connector element wherein is secured an optical fiber,
  there being a portion of said fiber protruding out of said connector element,
  said mounting means being mounted on a movable element,
(b) means to clamp, tension and bend said protruding portion of said fiber,
  said means being such that the amount of tensioning and bending will result in perfect breaking of a scored fiber,
(c) means to score said fiber,
  said scoring means being mounted on a stationary element, and
(d) means to adjust the location of said mounting means (a) relative to said scoring means (c), thus permitting accurate location of the broken-end face of said fiber relative to said connector element,
  said adjustment means comprising a threaded connector means to shift said movable element incrementally relative to said stationary element.

63. A breaker for optical fibers, comprising:
(a) means to removably mount, in a predetermined position, a connector element wherein is secured an optical fiber, there being a portion of said fiber protruding out of said connector element, said mounting means being a threaded element adapted to mate with a threaded portion of said connector element, (b) means to clamp, tension and bend said protruding portion of said fiber, said means being such that the amount of tensioning and bending will result in perfect breaking of a scored fiber, (c) means to score said fiber, and (d) means to adjust the location of said scoring means (c) relative to said mounting means (a), thus permitting accurate location of the broken-end face of said fiber relative to said connector element.

64. A hand-held breaker for optical fibers, comprising:

(a) handle means, (b) movably-mounted tension table means, (c) a clamp element movably mounted relative to said tension table means, (d) means to connect said handle means to said clamp element to shift the latter to a clamping position, at which an optical fiber is clamped between said clamp element and said tension table means, in response to movement of said handle means, (e) spring means cooperating with said means (d) to create a predetermined fiber clamping force on said fiber, (f) a scoring blade to score said clamped fiber, said blade having a slightly inclined scoring edge, and (g) means to move said edge transversely across the fiber with the upper region of said inclined edge leading the lower region thereof.

65. An optical fiber breaker, which comprises:

(a) a fiber support table having a curved surface which is adapted to support the optical fiber to be broken, (b) a scoring edge adapted to score said fiber while it rests on said table, (c) means to move said scoring edge along a curved path and into engagement with said fiber to score the same, said means including first cam means, (d) movable means to clamp said fiber, said means including a second cam means, and (e) means to tension said fiber to a predetermined tension, said predetermined tension and the curvature of said surface being such that a clean break at said fiber will result in response to said scoring by said scoring edge.

66. The invention as claimed in claim 65 in which said means (e) includes spring means to apply to said clamp means (d) a force adapted to create said predetermined tension in said fiber, further comprises third cam means to prevent movement of said clamp means in a fiber-tensioning direction until said third cam means is in a predetermined position, and further comprises means to shift said third cam means to said predetermined position after operation of said clamping means (d) and prior to scoring by said scoring edge.

* * * * *